United States Patent
Kiselis et al.

(10) Patent No.: US 9,010,782 B2
(45) Date of Patent: Apr. 21, 2015

(54) VEHICLE WITH A FOUR BAR LINK SUSPENSION SYSTEM PROVIDED WITH IMPROVED ROLL CHARACTERISTICS

(75) Inventors: Gregory Paul Kiselis, Oak Ridge, NC (US); Michael Alwyn Brown, Summerfield, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 0 days.

(21) Appl. No.: 13/577,052

(22) PCT Filed: Feb. 12, 2010

(86) PCT No.: PCT/US2010/024093
§ 371 (c)(1),
(2), (4) Date: Sep. 12, 2012

(87) PCT Pub. No.: WO2011/099981
PCT Pub. Date: Aug. 18, 2011

(65) Prior Publication Data
US 2013/0033018 A1  Feb. 7, 2013

(51) Int. Cl.
*B60G 5/00* (2006.01)
*B60G 7/00* (2006.01)
(Continued)

(52) U.S. Cl.
CPC .............. B60G 5/00 (2013.01); *Y10T 29/49826* (2015.01); B60G 7/001 (2013.01); B60G 9/003 (2013.01); B60G 11/27 (2013.01); *B60G 2200/31* (2013.01); *B60G 2202/13* (2013.01);
(Continued)

(58) Field of Classification Search
CPC ............ B60G 5/00; B60G 7/001; B60G 9/00; B60G 11/27; B60G 21/05
USPC ................... 280/124.106, 142.107, 124.116, 280/124.128, 124.13, 124.165, 124.166, 280/124.107
See application file for complete search history.

(56) References Cited

U.S. PATENT DOCUMENTS

| 2,180,860 | A | 11/1939 | Brown |
| 3,792,871 | A | 2/1974 | Chalmers |

(Continued)

FOREIGN PATENT DOCUMENTS

| GB | 1342642 | 1/1974 |
| JP | 59-179412 A | 12/1984 |

(Continued)

OTHER PUBLICATIONS

International Search Report for corresponding International Appl. PCT/US2010/024093.

(Continued)

*Primary Examiner* — Paul N Dickson
*Assistant Examiner* — Robert A Coker
(74) *Attorney, Agent, or Firm* — Michael Pruden; Martin Farrell

(57) ABSTRACT

The present invention relates to a vehicle and a method for improving the roll characteristics of a vehicle. The vehicle includes an axle, a sprung mass, a first control arm, a second control arm, a third control arm, a first pivotable joint, a second pivotable joint, a third pivotable joint, and a fourth pivotable joint. The torsional stiffness of the first control arm, the second control arm, the first pivotable joint, the second pivotable joint, the third pivotable joint, and the fourth pivotable joint are substantially equal to or greater than the torsional stiffness of the axle, whereby the axle bends and twists during a sprung mass roll event in order to limit an amount of roll.

20 Claims, 20 Drawing Sheets

(51) Int. Cl.
  *B60G 9/00*  (2006.01)
  *B60G 11/27* (2006.01)
  *B60G 21/05* (2006.01)

(52) U.S. Cl.
  CPC ..... *B60G2204/122* (2013.01); *B60G 2206/123* (2013.01); *B60G 2206/124* (2013.01); B60G 9/00 (2013.01); B60G 21/05 (2013.01); *B60G 2200/314* (2013.01); *B60G 2200/343* (2013.01); *B60G 2204/143* (2013.01); *B60G 2204/148* (2013.01); *B60G 2204/1482* (2013.01)

(56) References Cited

U.S. PATENT DOCUMENTS

| | | | |
|---|---|---|---|
| 4,667,974 A | | 5/1987 | Giese |
| 4,756,550 A | | 7/1988 | Raidel |
| 4,902,033 A | | 2/1990 | Tonomura |
| 5,366,035 A | * | 11/1994 | Hayashida et al. ........ 180/24.01 |
| 5,524,921 A | * | 6/1996 | Ellingsen ................ 280/124.116 |
| 5,564,521 A | * | 10/1996 | McLaughlin et al. ........ 180/352 |
| 5,649,719 A | * | 7/1997 | Wallace et al. ........ 280/124.156 |
| 5,678,845 A | | 10/1997 | Stuart |
| 6,109,630 A | * | 8/2000 | Dazy et al. ................ 280/124.11 |
| 6,206,407 B1 | * | 3/2001 | Fuchs et al. ................ 280/686 |
| 6,312,006 B1 | * | 11/2001 | Svensson ................ 280/683 |
| 6,439,588 B1 | * | 8/2002 | Svensson ................ 280/124.116 |
| 6,511,084 B1 | * | 1/2003 | Buhl et al. ............ 280/124.107 |
| 6,533,299 B2 | * | 3/2003 | Platner ................ 280/124.1 |
| 7,320,469 B2 | | 1/2008 | Bromley |
| 7,766,352 B2 | * | 8/2010 | Keeler ................ 280/124.116 |
| 7,967,307 B2 | * | 6/2011 | Reineck ................ 280/124.106 |
| 2004/0188973 A1 | | 9/2004 | Molitor |
| 2005/0073122 A1 | | 4/2005 | LeBlanc, Sr. et al. |
| 2006/0033298 A1 | | 2/2006 | Longworth et al. |
| 2008/0169622 A1 | | 7/2008 | Vareka |
| 2009/0014977 A1 | | 1/2009 | Molenarr |
| 2009/0020973 A1 | | 1/2009 | Richardson |

FOREIGN PATENT DOCUMENTS

| | | |
|---|---|---|
| JP | H0858328 A | 3/1996 |
| JP | H11180121 A | 7/1999 |
| JP | 2004-314650 A | 11/2004 |
| WO | 9817487 A1 | 4/1998 |

OTHER PUBLICATIONS

Extended European Search Report dated Jun. 5, 2014 of corresponding EP application No. 10845920.7.

Office action dated Feb. 4, 2014 of corresponding Japan application No. 2012-552849.

* cited by examiner

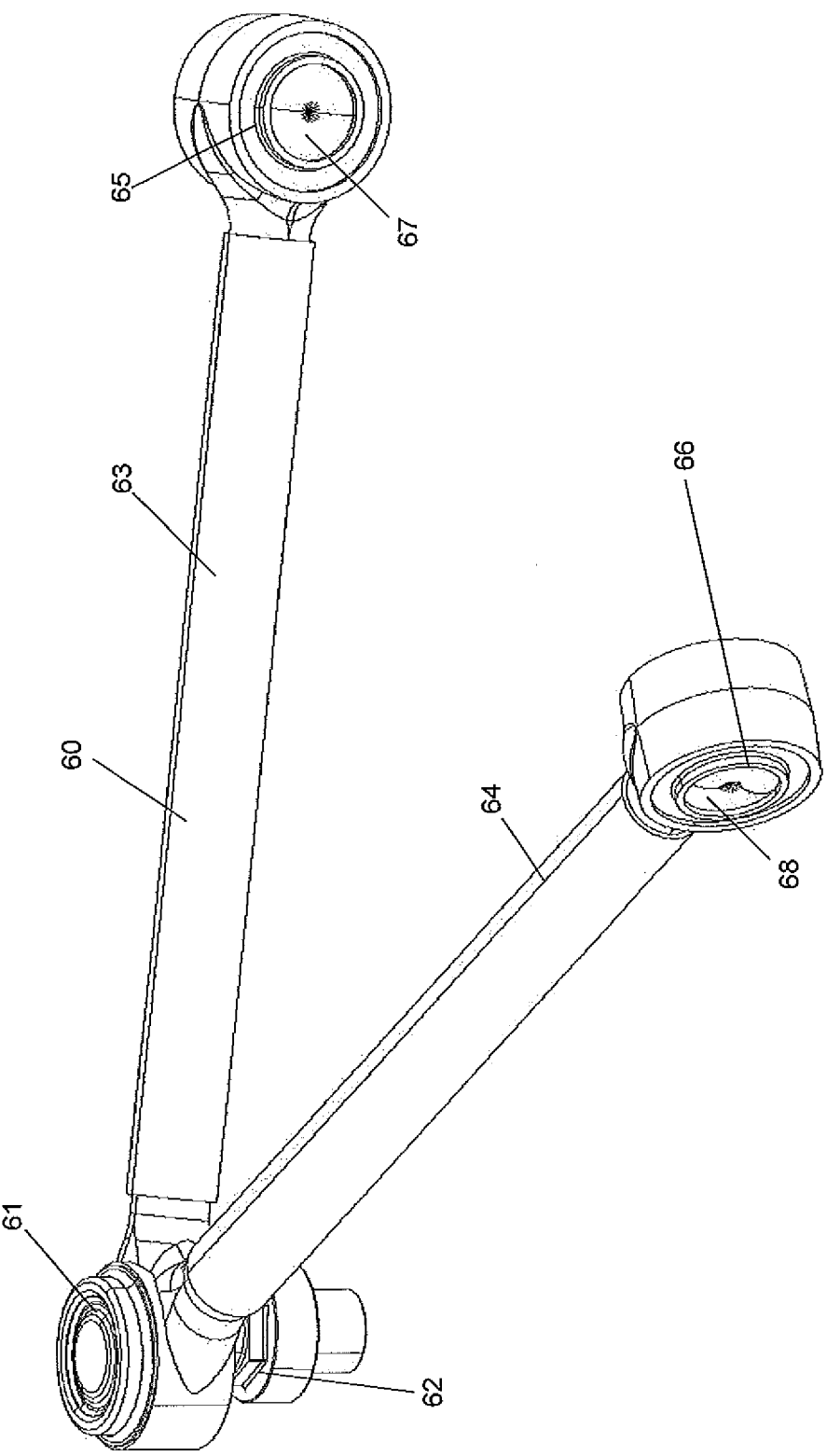

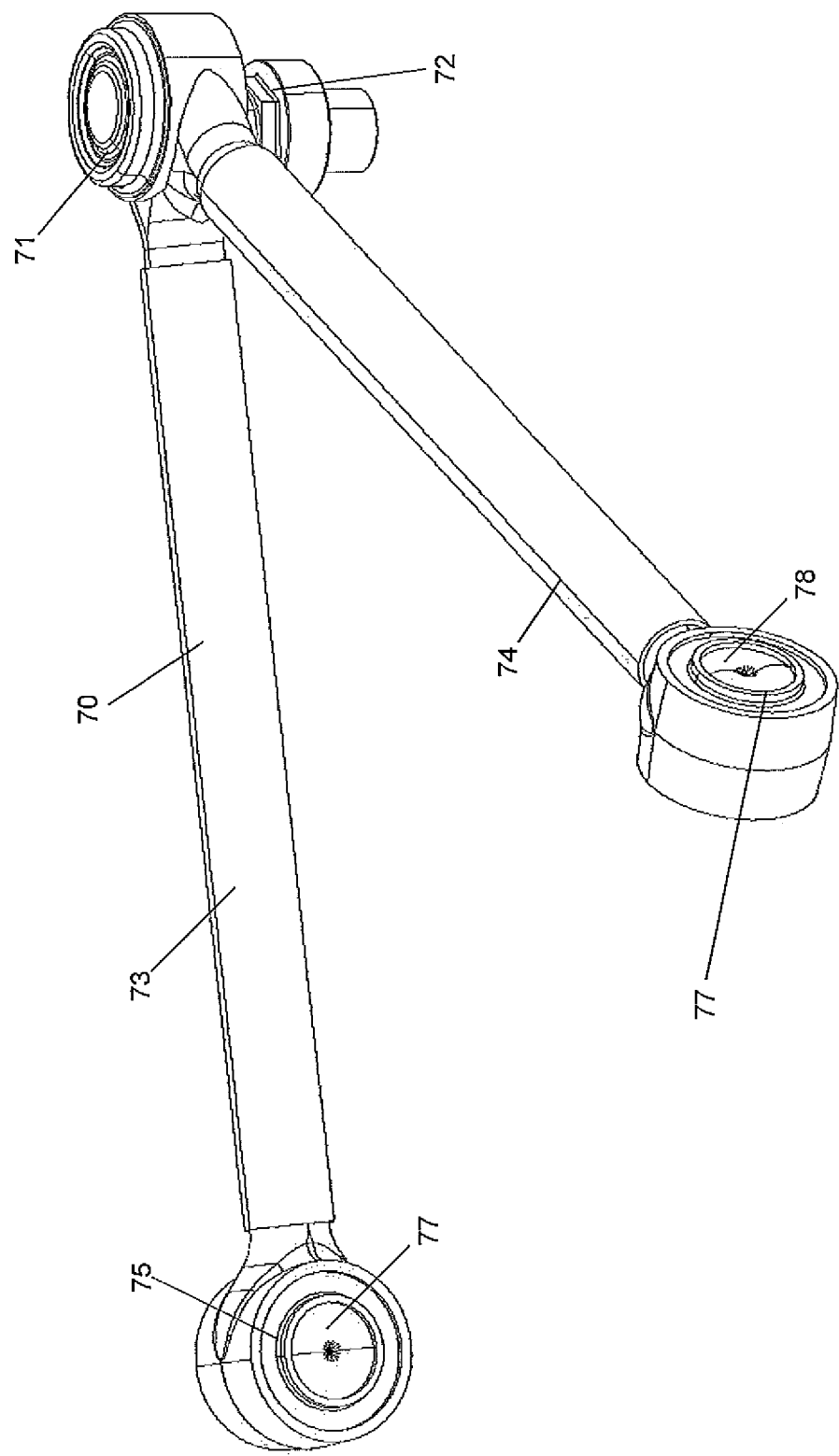

VEHICLE WITH A FOUR BAR LINK SUSPENSION SYSTEM PROVIDED WITH IMPROVED ROLL CHARACTERISTICS

FIELD OF THE INVENTION

The present invention relates to a vehicle it a four bar link suspension system provided with improved roll characteristics.

BACKGROUND OF THE INVENTION

Vehicles are typically provided with suspension systems that isolate the sprung mass, i.e. the components supported by the suspension system, from the unsprung mass, including, for example, the suspension system, wheels, and axles. Suspension systems typically include springs and sometimes dampers which act as an interface between the sprung and unsprung masses. The springs and dampers impart a degree of flexibility into the suspension system in order to dampen shock and isolate the sprung mass from vibrations, bumps, and road irregularities that are generated or encountered by the unsprung mass as the vehicle travels.

While the flexible characteristics of suspension systems imparted by the springs and dampers are desirable for purposes of providing a comfortable ride, inclusion of springs and dampers often times has a deleteriously affect on the handling of the vehicle. For example, during cornering or turning, the sprung mass of the vehicle may tilt or roll about the longitudinal axis of the vehicle frame. Whereas it would be desirable to stiffen the suspension system in order to increase the average roll rate of the sprung mass, for example by stiffening the springs, this would have a deleterious effect on the ability of the suspension system to dampen shock and isolate the sprung mass from vibrations, bumps, and road irregularities.

Another way to improve the roll rate is to utilize stabilizer bars. Stabilizer bars are typically mounted to the frame and opposite ends of the axle or opposing suspension control arms connected to opposite ends of the axle. During a roll event, when the sprung mass attempts to roll, the stabilizer bar restrains the rolling motion. As this occurs, torsion is applied to the stabilizer bar, which causes the stabilizer bar to bend and twist. Stabilizer bars are designed to have sufficient torsional resiliency to endure this bending and twisting motion and sufficient torsional stiffness to restrain the rolling motion. Advantageously, stabilizer bars are typically designed and positioned so that any bending and twisting that does occur is translated as a bending and twisting motion about an axis that is generally transverse to the axis about which roll occurs, whereby such bending and twisting does not substantially contribute to vehicle roll.

Yet another way to improve the roll characteristics is to use axles in a manner analogous to stabilizer bars. In particular, suspension control arms may be pivotably connected to the frame, for example, to a frame hanger bracket, via a pivotable joint and rigidly connected to the axle so that relative motion does not occur between the axle and the control arms during non-roll event driving conditions. Accordingly, during non-roll event driving conditions the control arms and axle pivot about the pivotable joint and the fixedly mounted portion of the control arm travels up and down with the axle in response to vibrations, bumps, and road irregularities generated or encountered by the unsprung mass as the vehicle travels.

During a roll event, however, when the sprung mass attempts to roll, the axle restrains the rolling motion. In particular, during a roll event, torsion is applied to the control arm, which, in turn, applies torsion to the axle, which, in turn, causes the axle to bend and twist. Axles used in this manner are designed to have sufficient torsional resiliency to endure this bending and twisting motion and sufficient torsional stiffness to restrain the rolling motion. Advantageously, since the bending and twisting motion is about an axis of the axle, which is generally transverse to the axis about which roll occurs, such bending and twisting does not substantially contribute to vehicle roll. In such a manner the axle may itself increase the roll rate, whether used in conjunction with stabilizer bars to provide auxiliary roll control or whether used in the absence of stabilizer bars. For heavy trailers and vehicles, such as, for example, truck tractors, cement trucks, and dump trucks, in particular, the ability to provide such roll control or auxiliary roll control may prove especially desirable.

As discussed above, previously known systems that employ axle bend and twist to limit sprung mass roll have entailed fixedly connecting the control arms to the axle, rather than pivotably connecting the control arms to the axle. However, relative to four bar link suspension systems, which include control arms pivotably connected to both the frame and the axle, such an arrangement generates deficiencies in certain aspects of vehicle handling. Accordingly, roll control aside, it is generally preferable from a handling standpoint to employ a four bar link type suspension system. As an example, those of ordinary skill in the art will appreciate that four bar link type suspension systems generally provide improved torque reactivity and improved longitudinal location of the axle relative to the frame as the axle moves up and down during non-roll event driving conditions. Previously known four bar link suspension systems have had the drawback, however, in that they have not used axle bend and twist to provide roll control or auxiliary roll control.

For example, U.S. Pat. No. 5,649,719 shows a four bar link arrangement comprising lower control arms pivotably mounted to the frame and the axle and an upper control arm pivotably mounted to the frame and the axle. Despite the desirableness of using an axle for roll control or auxiliary roll control, for a variety of reasons, arrangements such as that shown in U.S. Pat. No. 5,649,719 and a variety of other types of four bar linkage suspension systems have heretofore proved incapable of generating axle bend and twist to provide roll control.

The present invention is directed toward a vehicle with a four bar link suspension system provided with improved roll characteristics.

SUMMARY OF THE INVENTION

According to one embodiment of the present invention a vehicle, comprises an axle, a sprung mass, a first control arm, a second control arm, a third control arm, a first pivotable joint, a second pivotable joint, a third pivotable joint, and a fourth pivotable joint. The axle is provided with a torsional stiffness and a first end and a second end. The sprung mass includes a frame and mounted to the axle whereby the sprung mass may roll relative to the axle. The first control arm longitudinally locates the first end of the axle relative to the frame and includes a torsional stiffness. The second control arm longitudinally locates the second end of the axle relative to the frame and includes a torsional stiffness. The third control arm laterally locates the axle relative to the frame. The first pivotable joint pivotably connects the first control arm to the first end of the axle and is provided with a torsional stiffness. The second pivotable joint pivotably connects the first control arm to the frame and is provided with a torsional stiffness. The third pivotable joint pivotably connects the second control arm to the second end of the axle and is provided with a torsional stiffness. The fourth pivotable joint pivotably connects the second control arm to the frame and is provided with a torsional stiffness. The torsional stiffness of the first control arm, the second control arm, the first pivotable joint, the second pivotable joint, the third pivotable joint, and the fourth pivotable joint are substantially equal to or greater than the torsional stiffness of the axle, whereby the axle bends and twists during a sprung mass roll event in order to limit an amount of roll.

According to another aspect of the present invention a method for improving the roll characteristics of a vehicle comprises the steps of providing an axle including a first end, a second end and a torsional stiffness. Providing a sprung mass, including a frame, mounted to the axle whereby the sprung mass may roll relative to the axle. Providing a first control arm that longitudinally locates the first end of the axle relative to the frame and includes a torsional stiffness. Providing a second control arm that longitudinally locates the second end of the axle relative to the frame and includes a torsional stiffness. Providing a third control arm that laterally locates the axle relative to the frame. Providing a first pivotable joint that pivotably connects the first control arm to the first end of the axle and includes a torsional stiffness. Providing a second pivotable joint that pivotably connects the first control arm to the frame and includes a torsional stiffness. Providing a third pivotable joint that pivotably connects the second control arm to the second end of the axle and includes a torsional stiffness. Providing a fourth pivotable joint that pivotably connects the first control arm to the frame and includes a torsional stiffness. Selecting the torsional stiffness of the first control arm, the second control arm, the first pivotable joint, the second pivotable joint, the third pivotable joint, and the fourth pivotable joint to be substantially equal to or greater than the torsional stiffness of the axle, whereby the axle bends and twists during a sprung mass roll event in order to limit an amount of roll.

BRIEF DESCRIPTION OF THE DRAWINGS

FIG. 9A depicts a third control arm of a four bar link suspension system according to an embodiment of the present invention.

FIG. 9B depicts a sixth control arm of a four bar link suspension system according to an embodiment of the present invention.

DETAILED DESCRIPTION OF THE PREFERRED EMBODIMENT OF THE INVENTION

Figure 1:
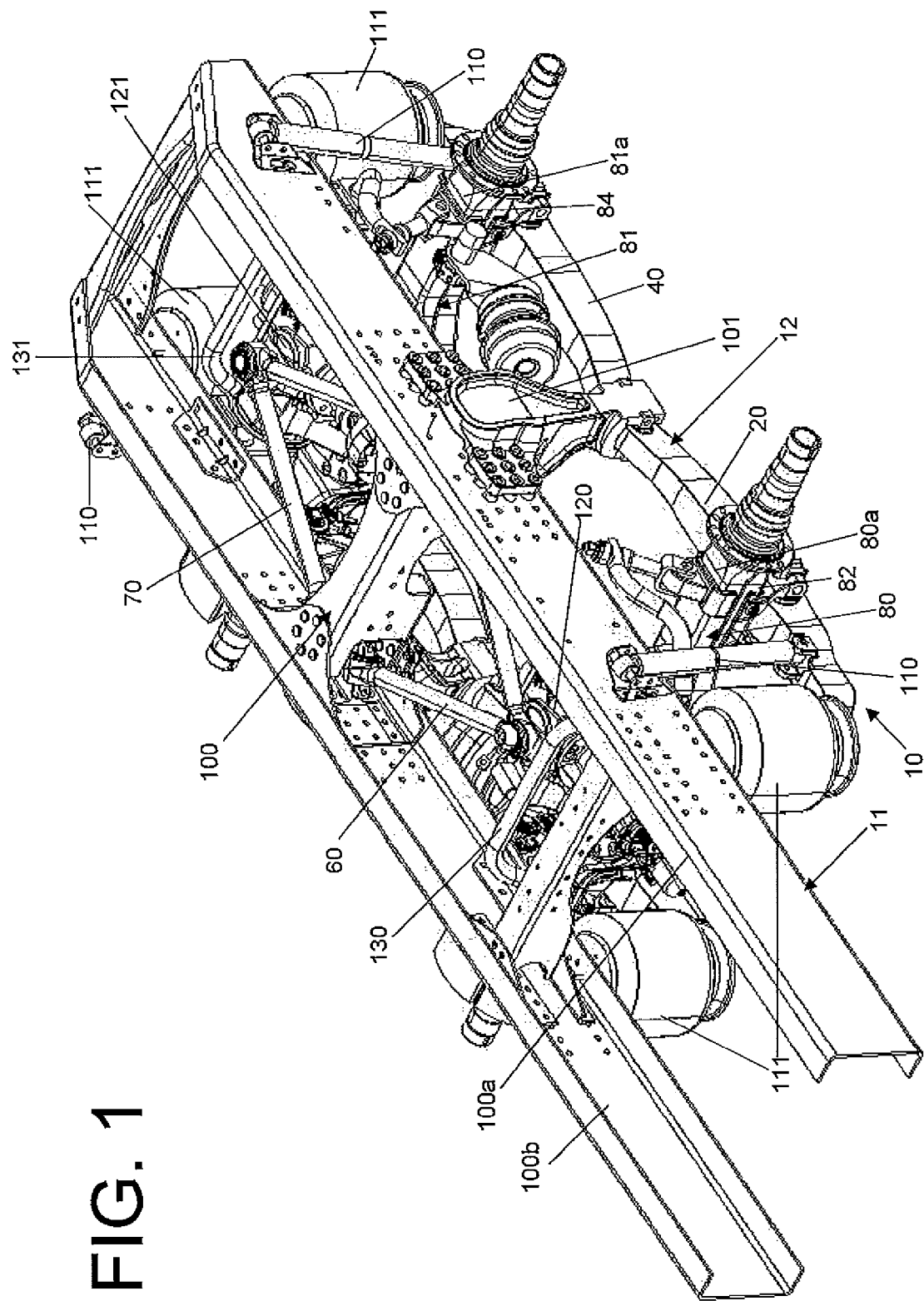
FIG. 1 depicts a perspective view of one side of a four bar link suspension system according to an embodiment of the present invention.

FIGS. 1-6 depict a four bar link suspension system 10 according to one embodiment of the present invention. According to one aspect of the present embodiment, the suspension system 10 is configured to mount the first and second axles 80, 81 to the frame 100 of a vehicle, such as, for example, and not limitation a tractor trader. According to another aspect of the present embodiment, the suspension system 10 is configured to support the sprung mass 11 of the vehicle, including, for example, and not limitation, the frame 100 and vehicle body (not shown) and components supported thereby. According to yet another aspect of the present embodiment, the suspension system 10 is configured to dampen the shock applied to the sprung mass 11 of the vehicle from vibrations, bumps, and road irregularities that are generated or encountered by the unsprung mass 12, including, by way of example, and not limitation, the axles 80, 81, wheels (not shown), and the suspension system 10. According to still yet another aspect of the present embodiment, the suspension system 10 is configured to increase the average roll rate of the sprung mass 11 of the vehicle.

Figure 2:
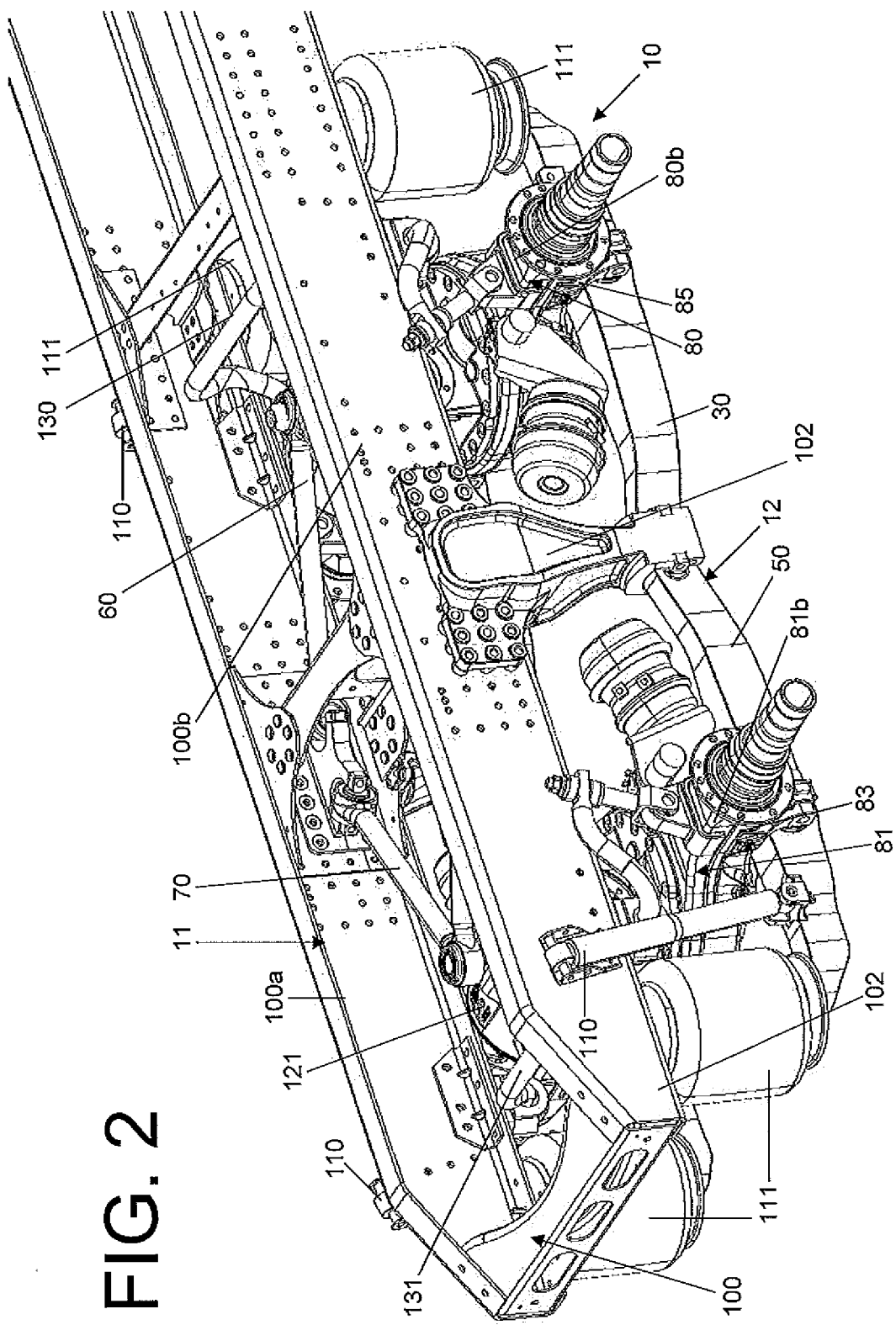
FIG. 2 depicts a perspective view of an opposite side as that shown in FIG. 1 of a four bar link suspension system according to an embodiment of the present invention.

As shown in FIGS. 1 and 2, the suspension system 10 may include a plurality of dampers, as at 110, which in the present embodiment, may be heavy duty shock absorbers. Those of ordinary skill in the at will appreciate that the dampers 110 dampen the shock applied to the sprung mass 11 of the vehicle from vibrations, bumps, of road irregularities that are generated or encountered by the unsprung mass 12 of the vehicle.

Figure 3:
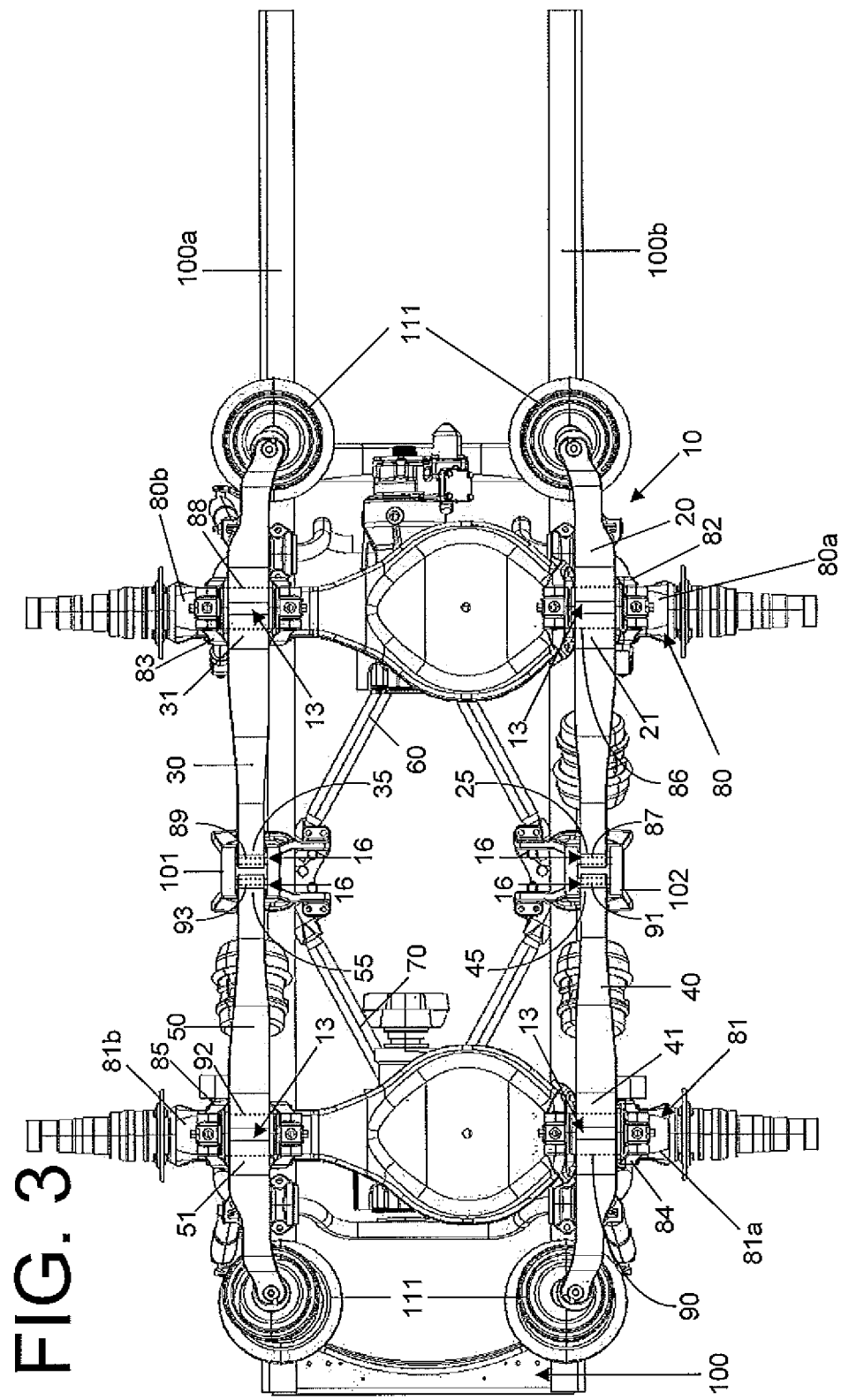
FIG. 3 depicts a bottom view of a four bar link suspension system according to an embodiment of the present invention.

Also shown in FIGS. 1 and 3, the suspension system 10 may also include springs 111, which may take a variety of forms, including air springs in the form of air bladders, as shown. According to one aspect of the present embodiment, the springs 111 support the sprung mass 11 of the vehicle. According to another aspect of the present embodiment, the springs 111 reduce the shock applied to the sprung mass 11 of the vehicle from vibrations, bumps, or road irregularities that are generated or encountered by the unsprung mass 12 of the vehicle. According to still yet another aspect of the present embodiment, the springs 111 may be used to adjust the ride height of the vehicle, for example, by connecting to the pneumatic supply (not shown) of the vehicle.

Although the present embodiment, is shown with dampers 110 and springs 111, those of ordinary skill in the art will appreciate that there are numerous ways to dampen and reduce the shock applied to the sprung mass 11 and that the foregoing arrangement is provided as one example of many that that are within the scope of the present invention.

Figure 6:
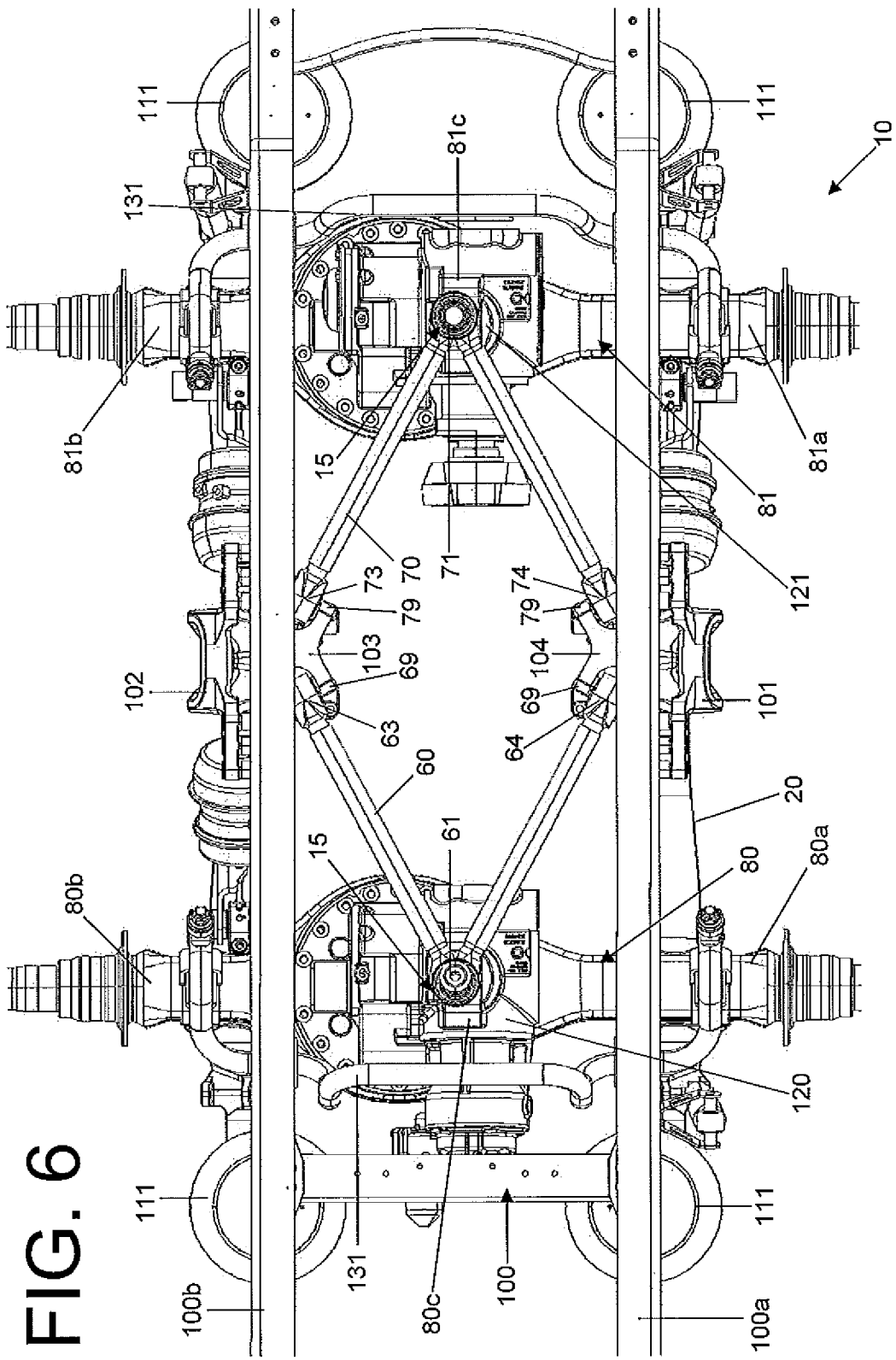
FIG. 6 depicts a top view of a four bar link suspension system according to an embodiment.

As shown, for example, in FIGS. 1, 2, and 6, the suspension system 10 may also include one or more stabilizer bars, as at 130, 131. According to one aspect of the present embodiment, the stabilizer bars 130, 131 are pivotably connected to the frame 100 and preferably to first and second frame members 100a, 100b, which extend transverse to the axle 80, 81 and substantially along the length of the frame 100. According to another aspect of the present embodiment, the stabilizer bars 130, 131 are pivotably connected to the respective axles 80, 81 and preferably the ends 80a, 80b, 81a, 81b of the axles 80, 81. In alternative embodiments the stabilizer bars 130, 131 may be connected to control arms 20, 30, 40, and 50. Although the present embodiment, is depicted with stabilizer bars 130, 131, one or both may be absent in alternative embodiments. Those of ordinary skill in the art will appreciate that a variety of types of stabilizer bars may be utilized to increase the roll rate of the sprung mass 11 and that the presently illustrated arrangement is just one of many within the scope of the present invention.

As shown in FIGS. 1-4, the suspension system 10 is preferably provided with first and second control arms 20, 30, fourth and fifth control arms 40, 50, and third and sixth control arms 60, 70. As shown in FIG. 3, according to one aspect of the present embodiment, at least one pivotable joint 13 is provided to connect each of the control arms 20, 30, 40, and 50 and an axle 80 or 81 and at least one pivotable joint 14 is provided to connect each of the control arms 20, 30, 40, and 50 and the frame 100. As shown in FIGS. 3 and 6, according to another aspect of the present embodiment, at least one pivotable joint 15 is provided to connect each of the control arms 60, 70 and an axle 80 or 81 and at least one pivotable joint 16, and preferably two, is provided to connect each of the control arms 60, 70 and the frame 100. While the present embodiment depicts revolute pivotable joints at 13, 14, and 16 and a ball joint at 15, those of ordinary skill in the art will appreciate that there are numerous arrangements within the scope of the present invention to provide pivotable joints.

Figure 4:
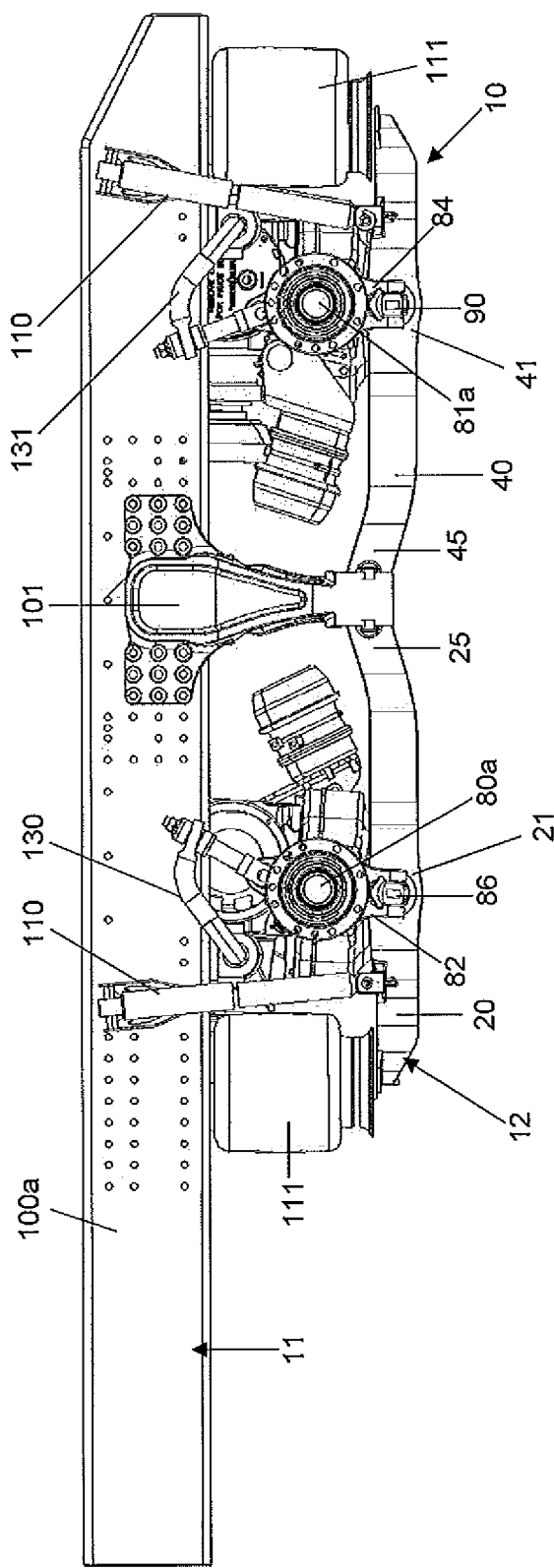
FIG. 4 depicts a side view of a four bar link suspension system according to an embodiment of the present invention.

As shown best in FIGS. 1, 3 and 4, the first control arm 20 is shown as an elongated member in the present embodiment. The first control arm 30 longitudinally locates the first end 80a of the axle 80 relative to the frame 100. As shown, the first control arm 20 extends generally transverse to the first axle 80. According to one aspect of the present embodiment, the first control arm 20 is provided with a first portion 21 that is configured to pivotably connect the first control arm 20 to a first end 80a of the first axle 80. According to another aspect of the present embodiment, the first portion 21 of the first control arm 20 is configured to move in conjunction with the first end 80a of the first axle 80. By way of example, in the event of an upward movement of the first end 80a of the first axle 80, the first portion 21 of the first control arm 20 will move upwards with the first end 80a of the first axle 80. Likewise, in the event of a downward movement of the first end 80a of the axle, the first portion 21 of the control arm 20 will move downward with the first end 80a of the first axle 80.

As shown in FIGS. 1, 3, and 4, the first portion 21 of the first control arm 20 is pivotably connected to the first end 80a of the first axle 80. Those of ordinary skill in the art will appreciate that it is within the scope of the present invention to utilize numerous arrangements for providing a pivotable joint 13 between the first control arm 20 and the first end 80a of the first axle 80 and that the arrangement shown in the presently illustrated embodiment is an example of one possible arrangement within the scope of the present invention.

In the presently illustrated embodiment, the first portion 21 is preferably pivotably connected with the first axle 80 via a mounting bracket 82. As shown, the mounting bracket 82 may be fixedly connected to the first end 80a of the first axle 80, for example, and not limitation, via fasteners, welding, or any suitable means. Also shown, the bracket 82 may be fixedly connected to the underside of the first end 80a of the first axle 80.

Figure 7A:
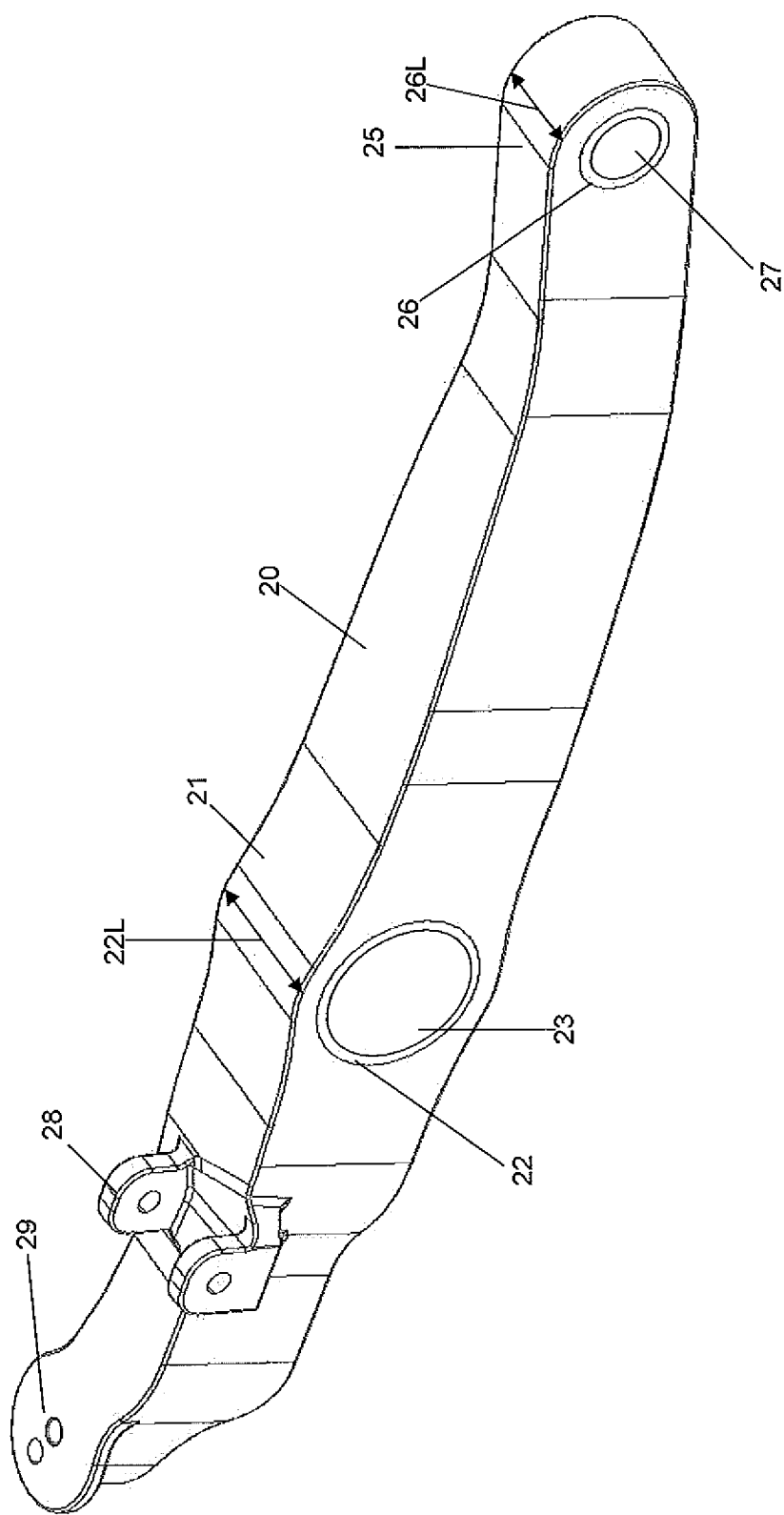
FIG. 7A depicts a first control arm of a four bar link suspension system according to an embodiment of the present invention.
Figure 7B:
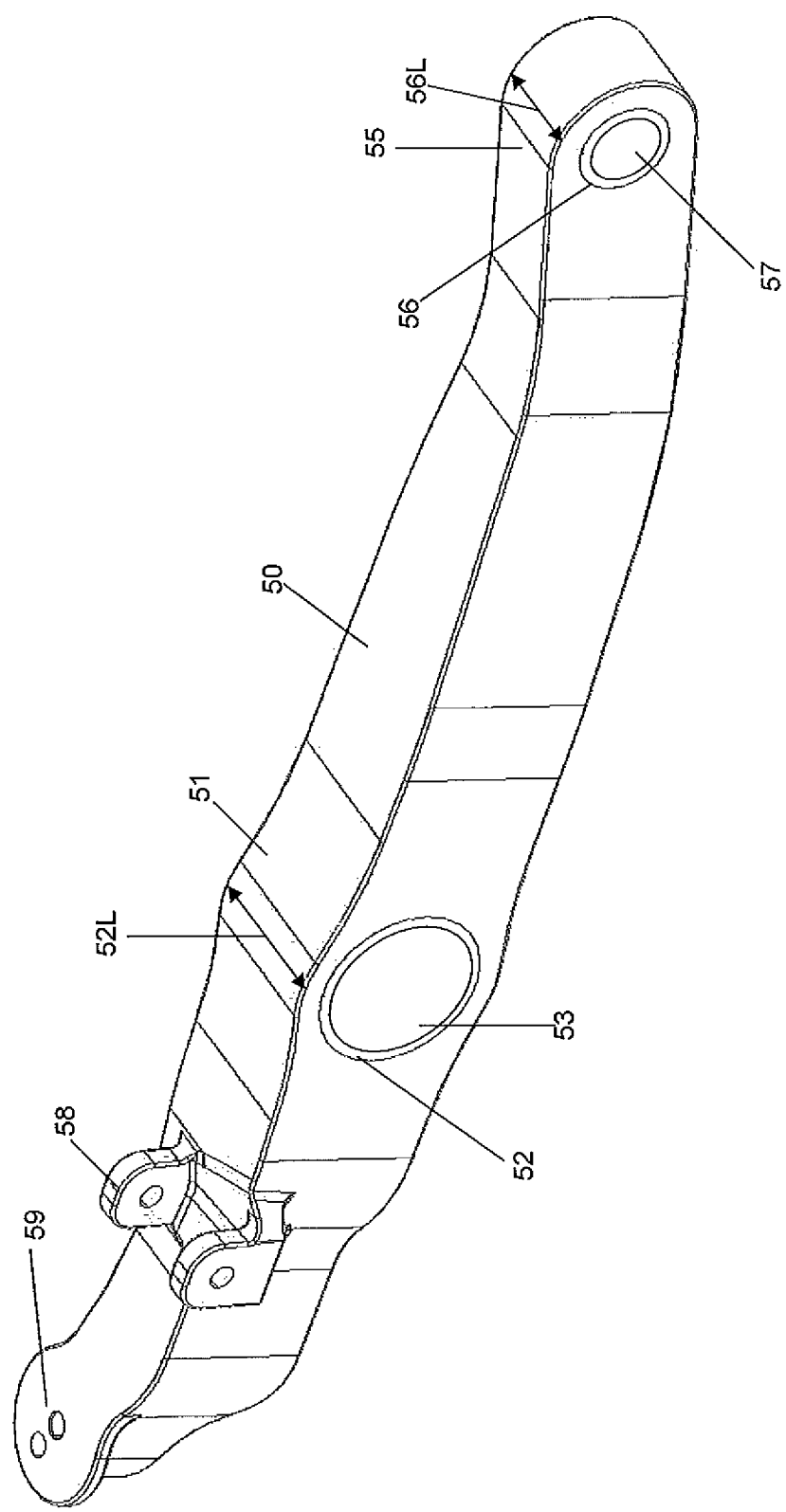
FIG. 7B depicts a fifth control arm of a four bar link suspension system according to an embodiment of the present invention.

As shown best in FIG. 3, the bracket 82 may secure a shaft 86, which includes a generally cylindrical portion that fits within a generally cylindrical bearing surface 22 (FIG. 7A) of the first portion 21 of the first control arm 20. As shown in FIG. 7A, in the present embodiment, the bearing surface 22 defines a bore, which preferably receives a generally cylindrical bushing 23, which in turn receives the generally cylindrical portion of the shaft 86. Those of ordinary skill in the art will appreciate that the bearing surface 22 and bushing 23 pivot about the generally cylindrical portion of the shaft 86 as the first end 80a of the first axle 80 moves up and down, for example, in response to irregularities of a surface on which the vehicle is being driven on.

According to another aspect of the present embodiment, the first control arm 20 is provided with a second portion 25 that is configured to pivotably connect the first control arm 20 to the vehicle frame 100. As shown best in FIGS. 3 and 4, the second portion 25 of the first control arm 20 is pivotably connected with a first frame hanger 101 that extends downward from a first frame member 100a of the frame 100. Those of ordinary skill in the art will appreciate that it is within the scope of the present invention to utilize numerous arrangements for providing a pivotable joint 14 between the first control arm 20 and the frame 100 and that the arrangement shown in the presently illustrated embodiment is an example of one possible arrangement within the scope of the present invention.

In the presently illustrated embodiment, the second portion 25 is preferably pivotably connected to the frame 100 via a shaft 87. In the present embodiment, the shaft 87 includes a generally cylindrical portion that fits within a generally cylindrical bearing, surface 26 (FIG. 7A) of the second portion 25 of the first control arm 20. As shown in FIG. 7A, in the present embodiment, the bearing surface 26 defines a bore, which preferably receives a generally cylindrical bushing 27, which in turn receives the generally cylindrical portion of the shaft 87. Those of ordinary skill in the art will appreciate that the bearing surface 26 and bushing 27 pivot about the generally cylindrical portion of the shaft 87 as the first end 80a of the first axle 80 moves up and down, for example, in response to irregularities of a surface on which the vehicle is being driven on.

As shown in FIG. 7A, the first control arm 20 may also preferably include a damper mounting portion 28 and an air bladder mounting portion 29. As shown, in the present embodiment, the damper mounting portion 28 and the air bladder mounting portion 29 are located at a generally opposite end of the first control arm 20 relative to the second portion 25.

Figure 5:
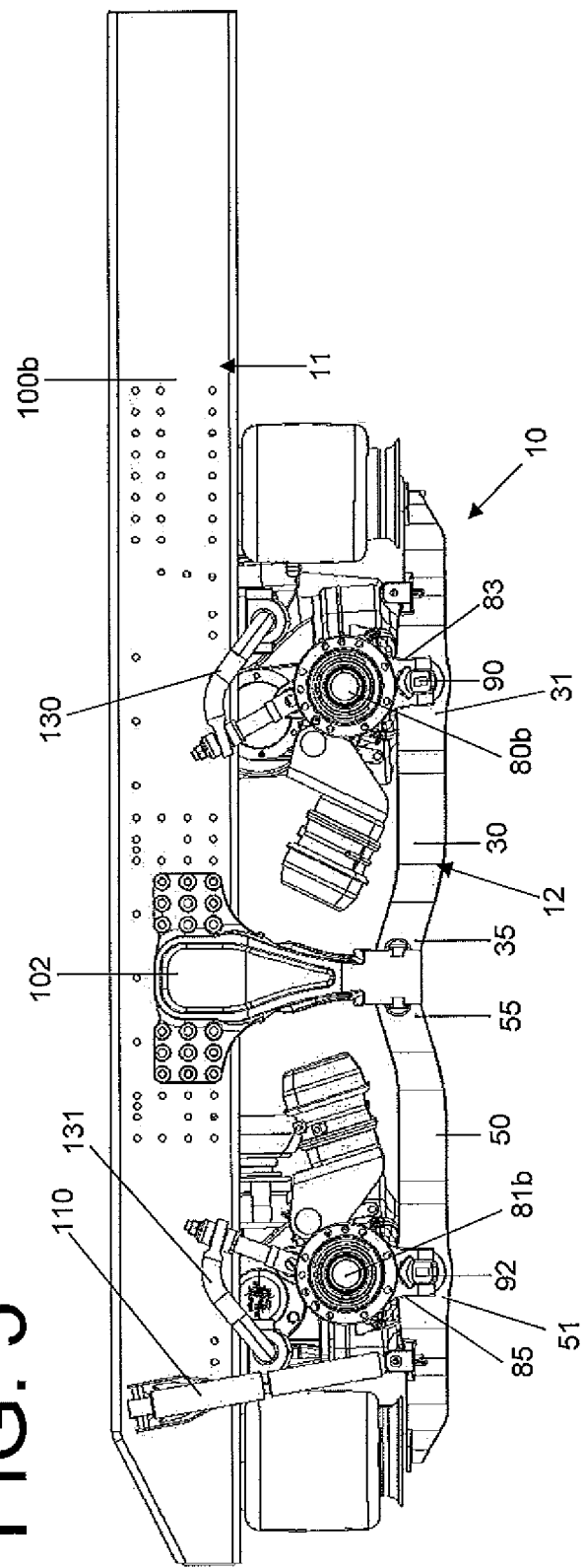
FIG. 5 depicts an opposite side view as that shown in FIG. 4 of a four bar link suspension system according to an embodiment of the present invention.

Turning now to FIGS. 2, 3, and 5, the second control arm 30 is shown as an elongated member in the present embodiment. As shown, the second control arm 30 is a mirror image of the first control arm 20. The second control arm 30 longitudinally locates the second end 80b of the axle 80 relative to the frame 100. As shown, the second control arm 30 extends generally transverse to the first axle 80.

According to one aspect of the present embodiment, the second control arm 30 is provided with a first portion 31 that is configured pivotably connect the second control arm 30 to a second end 80b of the first axle 80. According to another aspect of the present embodiment, the first portion 31 of the second control arm 30 is configured to move in conjunction with the second end 80b of the first axle 80. By way of example, in the event of an upward movement of the second end 80b of the first axle 80, the first portion 31 of the second control arm 30 will move upwards with the second end 80b of the first axle 80. Likewise, in the event of a downward movement of the second end 80b of the axle, the first portion 31 of the second control arm 30 will move downward with the second end 80b of the first axle 80.

As shown in FIGS. 2, 3, and 5, the first portion 31 of the second control arm 30 is pivotably connected to the second end 80b of the first axle 80. Those of ordinary skill in the art will appreciate that it is within the scope of the present invention to utilize numerous arrangements for providing a pivotable joint 13 between the second control arm 30 and the second end 80b of the first axle 80 and that the arrangement shown in the presently illustrated embodiment is an example of one possible arrangement within the scope of the present invention.

In the presently illustrated embodiment, the first portion 31 is preferably pivotably connected to the first axle 80 via a mounting bracket 83. As shown, the mourning bracket 83 may be fixedly connected to the second end 80b of the first axle 80, for example, and not limitation, via fasteners, welding, or any suitable means. For example, and not limitation, as shown, the bracket 83 may be fixedly connected to the underside of the second end 80b of the first axle 80.

As shown best in FIG. 3, the bracket 83 may secure a shaft 88, which includes a generally cylindrical portion that fits within a generally cylindrical bearing surface 32 (FIG. 8A) of the first portion 31 of the second control arm 30. As shown FIG. 8A, in the present embodiment, the bearing surface 32 defines a bore, which preferably receives a generally cylindrical bushing 33, which, in turn, receives the generally cylindrical portion of the shaft 88. Those of ordinary skill in the art will appreciate that the bearing surface 32 and bushing 33 pivot about the generally cylindrical portion of the shaft 88 as the first end 80a of the first axle 80 moves up and down, for example, in response to irregularities of a surface on which the vehicle being driven on.

According to another aspect of the present embodiment, the second control arm 30 is provided with a second portion 35 that is configured to pivotably connect the second control arm 30 to the vehicle frame 100. As shown in best in FIGS. 3 and 5 the second portion 35 of the second control arm 30 is pivotably connected to the second frame hanger 102 that extends downward from a second frame member 100b of the frame 100. Those of ordinary skill in the art will appreciate that it is within the scope of the present invention to provide numerous arrangements for providing a pivotable joint 14 between the second control arm 30 and the frame 100 and that the arrangement shown in the presently illustrated embodiment is an example of one possible arrangement within the scope of the present invention.

Figure 8A:
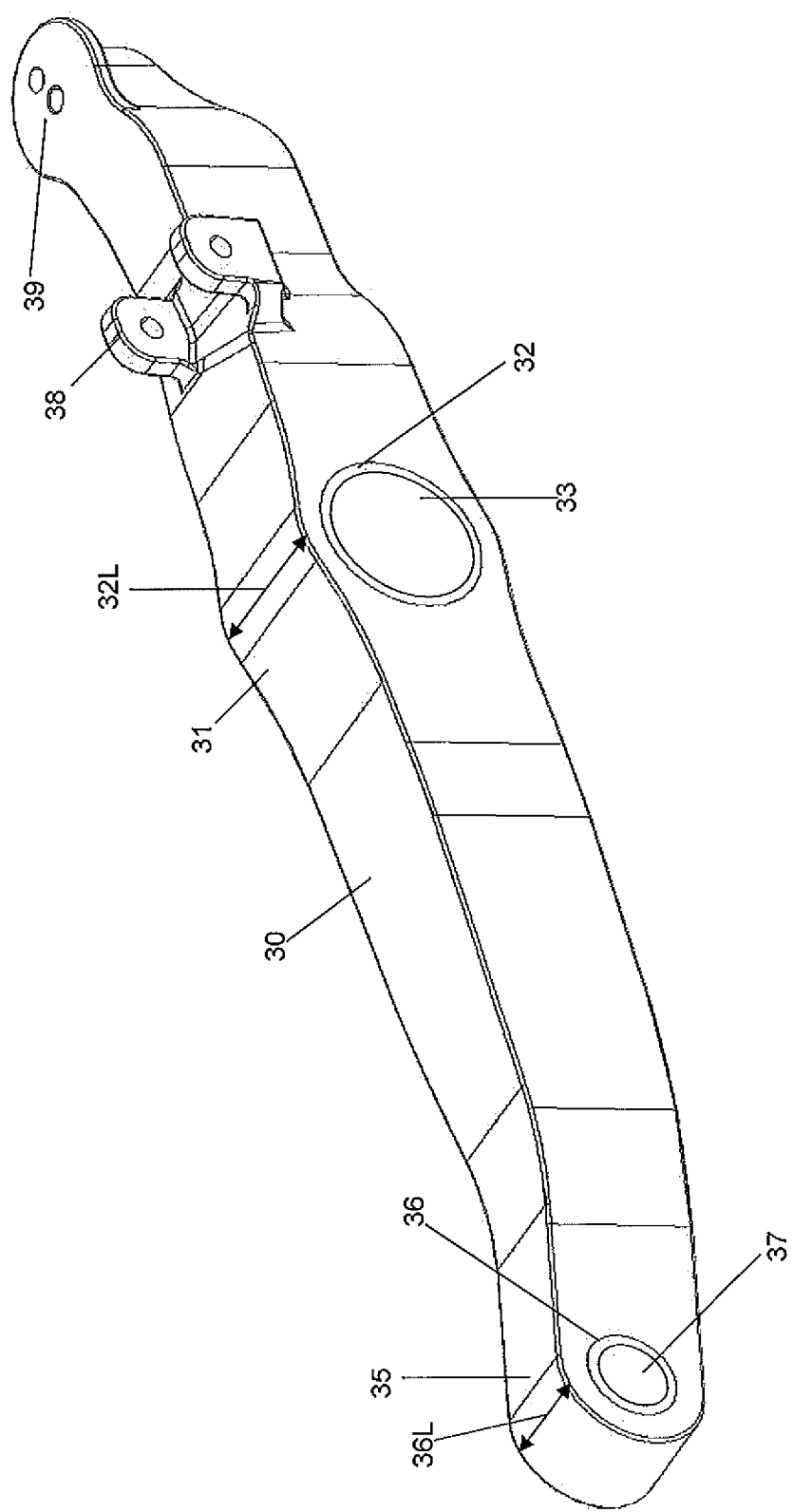
FIG. 8A depicts a second control arm of a four bar link suspension system according to an embodiment of the present invention.
Figure 8B:
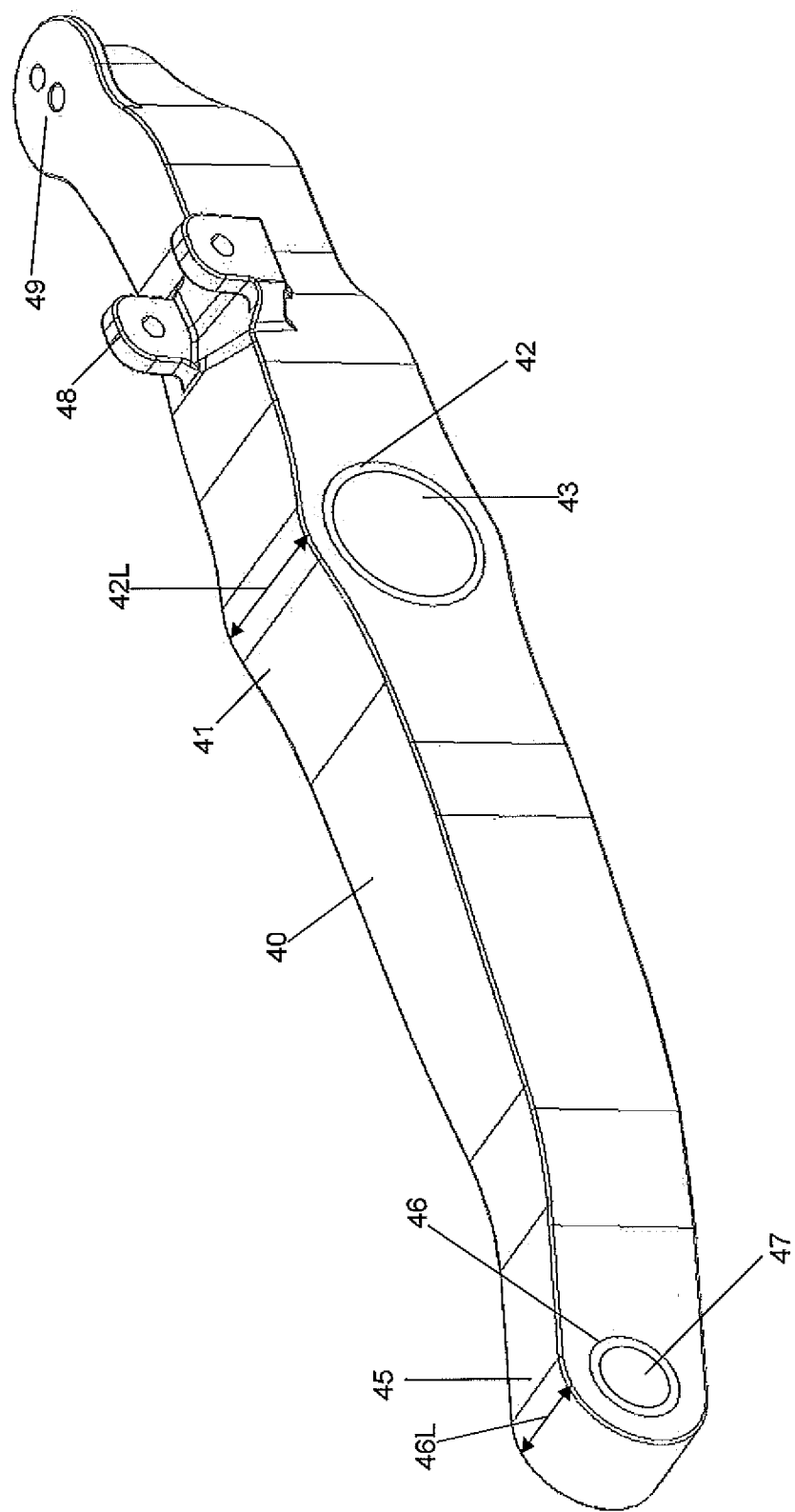
FIG. 8B depicts a fourth control arm of a four bar link suspension system according to an embodiment of the present invention.

In the presently illustrated embodiment, the second portion 35 is preferably pivotably connected to the frame 100 via a shaft 89, which is secured to the second frame hanger 102. In the present embodiment, the shaft 89 includes a generally cylindrical portion that fits within a generally cylindrical bearing surface 36 (FIG. 8A) of the second portion 35 of the second control arm 30. As shown in FIG. 8A, in the present embodiment, the bearing surface 36 defines a bore, which preferably receives a generally cylindrical bushing 37, which in turn receives the generally cylindrical portion of the shaft 89. Those of ordinary skill in the art will appreciate that the bearing surface 36 and bushing 37 pivot about the generally cylindrical portion of the shaft 89 as the second end 80b of the first axle 80 moves up and down, for example, in response to irregularities of a surface on which the vehicle is being driven on.

As shown in FIG. 8A, the second control arm 30 may also preferably include a damper mounting portion 38 and an air bladder mounting portion 39. As shown, in the present embodiment, the damper mounting portion 38 and the air bladder mounting portion 39 are located at a generally opposite end of the second control arm 30 relative to the second portion 35.

Turning now to FIGS. 1, 2, 3, and 6, the third control arm 60 is shown. The third control arm 60 laterally locates the axle 80 relative to the frame 100. In the present embodiment, the third control arm 60 is shown as a generally V-shaped member.

According to one aspect of the present embodiment, the third control arm 60 is provided with a first portion 61 that is configured to connect the third control arm 60 to the first axle 80. According to another aspect of the present embodiment, the first portion 61 is configured to move in conjunction with the first axle 80. By way of example, and not limitation, the third control arm 60 may be located in between where the first and second control arms 20, 30 are mounted to the first axle 80. In the present embodiment, the first portion 61 is shown mounted to a generally centrally located portion 80c of the first axle 80. In the event of an upward movement of the first axle 80, the first portion 61 of the third control arm 60 will move upwards with the first axle 80. Likewise, in the event of a downward movement of the first axle 80, the first portion 61 of the third control arm 60 will move downward with the first axle 80.

According to one aspect of the present embodiment, the first portion 61 is preferably mounted whereby the third control arm 60 limits the lateral movement of the first axle 80. According to another aspect of the present embodiment, the first portion 61 is preferably mounted whereby the third control arm 60 limits lateral movement of the first and second control arms 20, 30. In the present embodiment, the first portion 61 is shown pivotably mounted to the first axle 80. Those of ordinary skill in the art will appreciate that it is within the scope of the present invention to provide numerous arrangements for pivotably connecting the first portion 61 of the third control arm 60 to the first axle 80 and that the arrangement shown in the presently illustrated embodiment is an example of one possible arrangement within the scope of the present invention.

As shown best in FIG. 6, in the present embodiment, the first portion 61 is pivotably mounted to a first differential housing 110 provided on the generally centrally located portion 80c of the first axle 80. As shown in FIG. 9A, in the present embodiment, the first portion 61 of the third control arm 60 is provided with a ball joint 62, which, as shown in FIG. 6, is pivotably mounted to the first differential housing 110 provided on the generally centrally located portion 80c of the first axle 80.

As shown best in FIG. 6, extending from the first portion 61 of the third control arm 60 are second and third portions 63, 64 of the third control arm 60. In the present embodiment, the second and third portions 63, 64 are elongated members that extend generally symmetrically from the first portion 61 to provide a generally V-shaped third control arm 60.

According to one aspect of the present embodiment, the second and third portions 63, 64 are configured connect the third control arm 60 to the vehicle frame 100. As shown in FIG. 6, in the present embodiment, the second and third portions 63, 64 are pivotably mounted to respective first and second frame members 100a, 100b, via respective frame brackets 103, 104. Those of ordinary skill in the art will appreciate that it is within the scope of the present invention to provide numerous arrangements for pivotably connecting the second and third portions 63, 64 to the frame 100 and that the arrangement shown in the presently illustrated embodiment is an example of one possible arrangement within the scope of the present invention.

As shown in FIG. 6, in the presently illustrated embodiment, the second and third portions 63, 64 pivotably connect to the frame via shafts 69, which are secured to the brackets 103, 104. In the present embodiments, the shafts 69 include general cylindrical portions that fit within respective generally cylindrical bearing surfaces 65, 66 (FIG. 9A) of the second and third portions 63, 64 of the third control arm 60. As shown in FIG. 9A, in the present embodiment, the bearing surfaces 65, 66 define bores, which preferably receive generally cylindrical bushings 67, 68, which in turn receive the generally cylindrical portions of the shafts 69. Those of ordinary skill in the art will appreciate that the bearing surfaces 65, 66 and bushings 67, 68 pivot about the generally cylindrical portion of the shafts 69 as the first axle 80 moves up and down, for example, in response to irregularities of a surface on which the vehicle is being driven on.

Turning now to FIGS. 1, 3, and 4, the fourth control arm 40 is shown as an elongated member in the present embodiment. The fourth control arm 40 longitudinally locates the first end 81a of the axle 81 relative to the frame 100. As shown, the fourth control arm 40 extends generally transverse to the second axle 81.

The fourth control arm 40 is preferably a mirror image of the first control arm 20 and preferably identical to the second control arm 30. As shown, the fourth control arm 40 extends in an opposite direction from the first frame hanger 101, relative to the first control arm 20, and connects with a second axle 81 in a similar manner as the first control arm 20 connects to the first axle 80. Accordingly, those of ordinary skill in the art will appreciate that the depicted first portion 41, mounting bracket 84, shaft 90, bearing surface 42, bushing 43, second portion 45, shaft 91, bearing surface 46, bushing 47, damper mounting portion 45, air bladder mounting portion 49 as shown in relation to the fourth control arm 40 generally correspond to the respective first portion 21, mounting bracket 82, shaft 86, hearing surface 22, bushing 23, second portion 25, shaft 87, bearing surface 26, bushing 27, damper mounting portion 28, air bladder mounting portion 29 as described in relation to the first control arm 20.

Turning now to FIGS. 2, 3, and 5, the fifth control arm 50 is shown as an elongated member in the present embodiment. The fifth control arm 50 longitudinally locates the second end 81b of the axle 81 relative to the frame 100. As shown, the fifth control arm 50 extends generally transverse to the second axle 81.

The fifth control arm 50 is preferably a mirror image of the second and fourth control arms 30, 40 and preferably identical to the first control arm 20. As shown, the fifth control arm 50 extends in an opposite direction from the second frame hanger 102, relative to the second control arm 40, and connects with a second axle 81 in a similar manner as the second control arm 40 connects to the first axle 80. Accordingly, those of ordinary skill in the art will appreciate that the depicted first portion 41, mounting bracket 85, shaft 92, bearing surface 52, bushing 53, second portion 55, shaft 93, bearing surface 56, bushing 57, damper mounting portion 58, air bladder mounting portion 59 as shown in relation to the fifth control arm 40 generally correspond to the respective first portion 31, mounting bracket 83, shaft 88, bearing surface 32, bushing 33, second portion 35, shaft 89, bearing surface 36, bushing 37, damper mounting portion 38, air bladder mounting portion 39 as described in relation to the second control arm 30.

Turning now to FIGS. 1, 2, 3, and 6, the sixth control arm 70 is shown. The sixth control arm 70 laterally locates the axle 81 relative to the frame 100. In the present embodiment, the sixth control arm 70 is shown as a generally V-shaped member. As shown, the sixth control arm 70 extends in a generally opposite direction from the frame brackets 103, 104 as the third control arm 60 and connects to the second axle 81 in a similar manner as the third control arm 60 connects to the first axle 80. Accordingly, those of ordinary skill in the art will appreciate that the depicted first portion 71, generally centrally located 81c, ball joint 72, differential housing 111, second and third portions 73, 74, shafts 79, generally cylindrical bearing surfaces 75, 76, and generally cylindrical bushings 77, 78 as shown in relation to the sixth control arm 70 generally correspond to the respective first portion 61, generally centrally located 80c, ball joint 62, differential housing 110, second and third portions 63, 64, shafts 69, generally cylindrical bearing surfaces 65, 66 and generally cylindrical bushings 67, 68 as described in relation to the third control arm 60.

Advantageously, the control arms 20, 30, 40, and 50 of the present embodiment, are configured to increase the average roll rate of the sprung mass 11, for example, during turning or cornering. Those of ordinary skill in the art will appreciate that during cornering maneuvers, the sprung mass 11 of the vehicle tends to tilt or roll. Those of ordinary skill in the art will also appreciate that stabilizer bars, such as, stabilizer bars 130, 131 have heretofore been the customary means employed to increase the average roll rate while allowing for a comfortable ride, i.e. without requiring stiffened suspension springs. Advantageously, the present embodiment provides a level of roll control that is further enhanced. Further, even in the absence of stabilizer bars 130, 131, the principals of the present embodiment, may be employed to achieve a level of roll control which is significantly improved while allowing for a comfortable ride, i.e. without requiring stiffened suspension springs.

Those of ordinary skill in the art will appreciate that during a roll event one side of the vehicle frame 100 is urged downward towards the surface upon which the vehicle is traveling. Those of ordinary skill in the art will also appreciate that during the roll event the opposite side of the vehicle frame 100 tends to be urged upward and way from the surface upon which the vehicle is traveling. For example, the second frame member 100b may move closer to the ground, and the first frame member 100a may move away from the ground. As this occurs, the suspension springs, such as, for example, dampers 110, and air springs 111, tend to compress, due to an increase in applied force, on the side of the frame 100 that is urged downward and the suspension springs on the opposite side of the frame 100 tend to outstretch or expand, due to a decrease in applied force. Assuming for illustration purposes that the ground upon which the vehicle is traveling is level and flat, as this occurs, the frame 100 no longer lies in a plane that extends parallel to the ground. Accordingly, as the frame 100 rolls or tilts from side to side the frame 100 extends at an angle relative to the ground. As this occurs, the frame hangers 101, 102, which are fixedly and rigidly attached to the respective frame members 100a. 100b, likewise move in a similar manner along with the rest of the frame 100.

Figure 12:
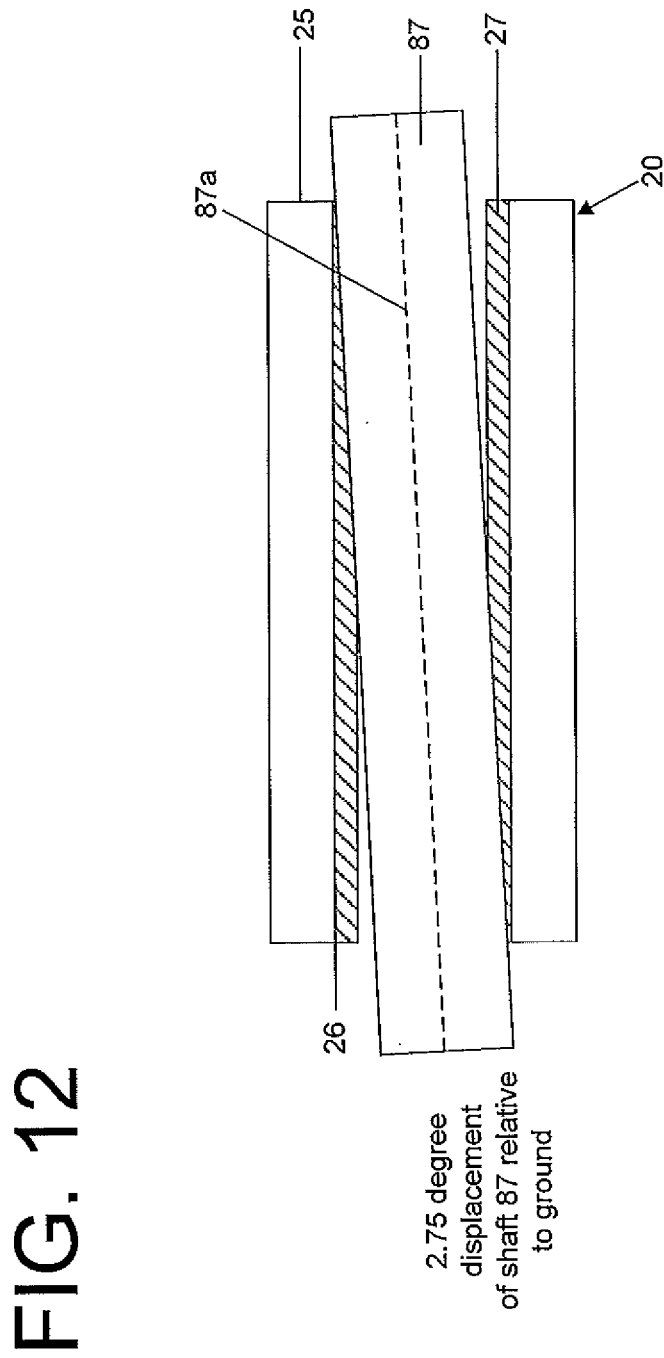
FIG. 12 depicts a relationship between a shaft and an elongated bearing surface of a control arm of a four bar link suspension system in an embodiment of the present invention during a roll event.

Turning now to FIG. 12, as the frame 100, including the frame hangers 101, 102, rolls, the shafts 87, 89, 91, 93 (FIG. 3) which pivotably mount the second portions 25, 35, 45, 55 of the control arms 20, 30, 40, 50, roll as well. Although FIG. 12 shows only shaft 87 and only the second portion 25 of the first control arm 20, it will be appreciate by those of ordinary skill in the art that the shafts 89, 91, 93 behave in a similar manner in relation to second portions 35, 45, 55, respectively, on respective control arms 30, 40, 50. As this occurs, the shafts 87, 89, 91, 93 eventually apply a torquing force to the second portions 25, 35, 45, 55 of the control arms 20, 30, 40, 50. In previously known four bar link suspension arrangements, while the lower control arms have been sufficient stiffness and strength to withstand axial loads, the lower control arms have heretofore not been provided with sufficient torsional stiffness or rigidity to resist this applied torquing force. Accordingly, in previously known arrangements the control arms would bend and twist in response to the application of this torsional force. Torsional bending and twisting about the length-wise axis of the control arms 20, 30, 40, and 50 is undesirable since this tends to promote roll.

Advantageously, unlike previously known arrangements, the control arms, 20, 30, 40, 50 of the present embodiment, are provided with increased torsional stiffness or torsional rigidity. The amount of torsional stiffness or torsional rigidity may be established by empirical analysis and will depend on the forces encountered, which in turn will depend on the vehicle type, weight, spring rate of suspension springs speed, and a number of other factors. Accordingly, as described in relation to the present embodiment, as the shafts 87, 89, 91, 93 roll or are axially displaced at an angle relative to the ground, the control arms 20, 30, 40, and 50, which are provided with increased torsional stiffness are sufficiently robust to resist and limit the amount of roll or axial displacement that the shafts 87, 89, 91, 93 may experience.

As this occurs, the torsional forces applied to the control arms 20, 30, 40, 50 by the shafts 87, 89, 91, 93 are ultimately transmitted to the axles 80, 81 in a similar, but opposite manner as that shown in FIG. 12, i.e. the first portions 21, 31, 41, 51 of the control arms 20, 30, 40, and 50 apply torque to the axles 80, 81. For example, in the presently illustrated embodiment, bearing surface 22 and bushing 23 on the first portion 21 of the first control arm 20 may apply torque to the shaft 86 to which it is pivotably mounted. The shaft 86 may, in turn, transfer torque to the bracket 82, which may in turn transfer torque to the first end 80a of the first axle 80. Those of ordinary skill in the art will appreciate that in a similar manner torque would be applied to the second 80b of the first axle 80, the first end 81a of the second axle 81, and the second end 81b of the second axle 81, via the respective control arms 30, 40, and 50. As the torquing forces are ultimately applied to the first and second axles 81, 82, the axles 80, 81 may undergo bend and twist about their axes. By way of example, the first ends 80a, 81a may bend and twist in a first direction, for example, clockwise or counter clockwise about the length-wise axe of the first and second axles 80, 81, and the second ends 80b, 81b, may bend and twist in an opposite direction.

Advantageously, since the torquing forces are absorbed as a bending and twisting motion that occurs about the length-wise axes of the axles 80, 81 and since said length-wise axes extend generally transverse to the length-wise axes of the control arms 20, 30, 40, 50 and generally transverse to the axis about which the frame 100 tilts during a roll event, such bending and twisting motion does not substantially promote the occurrence of a roll event as the case may be in the event the control arms 20, 30, 40, 50 bend and twist about their length-wise axes, as occurs in previously known arrangements. Accordingly, unlike a bending and twisting motion of the control arms 20, 30, 40, and 50, the bending and twisting motion experienced by the axles 80, 81 does not substantially contribute to a roll event. Accordingly the axles 80, 81, in effect, function in a manner that is analogous to a stabilizer bar.

Those of ordinary skill in the art will appreciate that the first control arm 20, the axle 80, the third control arm 60, and the frame 100 function as a four bar linkage. Those of ordinary skill in the art will appreciate that the second control arm 30, the axle 80, the third control arm 60, and the frame 100 function as another four bar linkage. Those of ordinary skill in the art will appreciate that the fourth control arm 40, the axle 81, the sixth control arm 70, and the frame 100 function as still another four bar linkage. Those of ordinary skill in the art will appreciate that the fifth control arm 50, the axle 81, the sixth control arm 70, and the frame 100 function as still yet another four bar linkage.

Accordingly the stiffness of each link in the four bar systems represent a point at which the forces generated during a roll event may impart undesirable bending or twisting in the four bar link system in a manner that promotes roll behavior or roll-like behavior. Generally, speaking, however, in a four bar suspension systems, the frame, including the rails and hangers have been provided with sufficient stiffness to resist such forces, including torsional forces and bending forces which could impart twisting or bending of the frame in a manner which permits roll behavior or roll-like behavior. Like previously known four bar systems, in the present embodiment, the frame 100 is also preferably provided with a torsional stiffness sufficient to resist such forces, including torsional and bending forces that could impart twisting or bending in a manner that permits roll or roll-like behavior. In particular, the frame 100 is preferably provided with a torsional stiffness greater than the torsional stiffness of the control arms 20, 30, 40, and 50.

In the previously known arrangements, however, the lower control arms have represented the weakest link in such four bar link systems and the occurrence of bending and twisting about the length-wise axes of such control arms promoted a roll event. Further any bushing compression or bending/twisting at the pivotable joints of such control arms also promoted a roll event.

The present embodiment, provides a solution to this problem by providing control arms 20, 30, 40, and 50 and pivotable joints 13, 14, which are provided with a torsional stiffness that is greater than or substantially equal to the torsional stiffness of the axles 80, 81. In embodiments wherein the control arms 20, 30, 40, and 50 and pivotable joints 13, 14 are provided with a torsional stiffness greater than the torsional stiffness of the axles 80, 81, the axles 80, 81 will bend and twist while resisting the forces generated during a roll event, as previously described. This may entail the provision of sufficiently torsionally stiffer axles 80, 81 or more resilient axles than are typically employed, which could increase cost. In order to generate such bend and twist, this, in turn would entail the use of control arms 20, 30, 40, 50 that are even more torsionally stiff than the axles 80, 81, which in turn would further increase cost.

While the forgoing arrangement is within in the scope of the present invention, in a preferred embodiment, the control arms 20, 30, 40, 50 and pivotable joints 13, 14 are provided with a torsional stiffness substantially equal to the torsional stiffness of the axles 80, 81. According to one aspect of the presently preferred embodiment, the control arms 20, 30, 40, 50 would bend and twist about their length-wise axes and the axles 80, 81 will bend and twist about their length-wise axes. Although such bending and twisting of the control arms 20, 30, 40, 50 pivotable joints 13, 14 would contribute to roll, to some extent, the system of such an embodiment provides benefits since some of the forces generated during a roll event would be absorbed by the axles 80, 81 via bend and twist. This arrangement may in turn allow for the use of less torsionally stiff axles 80, 81 and less torsionally stiff control arms, 20, 30, 40, and 50 and pivotable joints 13, 14, which in turn may be less costly while still providing significantly enhanced roll characteristics.

Figure 13:
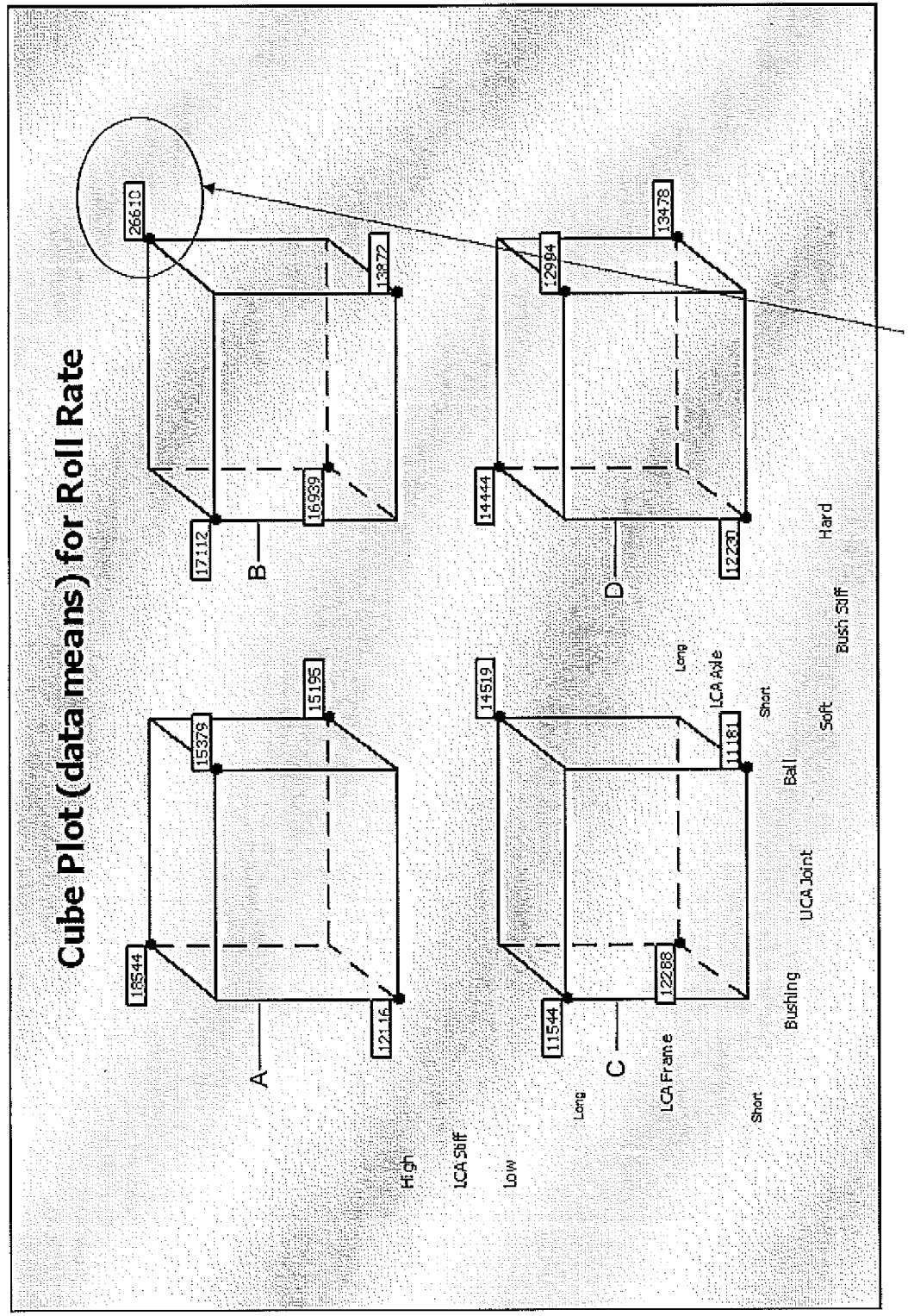
FIG. 13 depicts cube plots showing the average roll rate achieved N·m/° as a function of the following variables: the torsional stiffness of the first, second, fourth, and fifth control arms, the hardness of bushings used in pivotable joints for pivotably connecting the first, second, fourth, and fifth control arms to the axles and the frame, the use of ball joints or a bushings in the pivotable joints used to pivotably connect the third and sixth control arms to the axles, and the length of the bearing surfaces used in pivotable joints for pivotably connecting the first, second, fourth, and fifth control arms to the axles and the frame.

FIG. 13 illustrates the affect use of relatively torsionally stiff control arms 20, 30, 40, and 50 and pivotable joints 13, 14 have on vehicle roll in the form of cube plots A, B, C, and D. As shown therein, the cubes A and B provide the average roll rates achieved according to a number of variables, including the use of relatively high torsionally stiff control arms. For example, and not limitation, in the example modeled the control arms are provided with a torsional stiffness of 1.00E7 mm$^4$ and axles are provided with a corresponding level of torsional stiffness, i.e. 1.00E7 mm$^4$. Likewise, cube plots C and D provide the average roll rates achieved according to a number of variables, including the use of relatively tow torsionally stiff control arms. For example, and not limitation, in the example modeled the control arms are provided with a torsional stiffness of 1.00E4 mm$^4$ and axles are provided with a corresponding level of torsional stiffness, i.e. 1.00E4 min$^4$.

As shown, the highest average roll rate, i.e. 26,610 N·m/°, in cube B, is achieved when relatively high torsionally stiff control arms are employed, whereas the lowest average roll rate, i.e. 11,181 N·mm/°, in cube C, is achieved when relatively low torsionally stiff control arms are employed. Furthermore, the advantageous affect achieved via the use of torsionally stiffened control arms 20, 30, 40, and 50 is further illustrated by the observation that out of eight data measurements shown in cubes A and B, six out of the eight represent the highest roll rates achieved amongst the sixteen data measurements shown in cubes A, B, C, and D.

Accordingly, unlike previously known arrangements, in the present embodiment, the control arms 20, 30, 40, 50 are provided with a torsional stiffness that is selected according to a desired average roll rate for the vehicle. According to another aspect of the present embodiment, the control arms 20, 30, 40, 50 are provided with a torsional stiffness that is selected to increase the average roll rate for the sprung mass 11 of the vehicle. Those of ordinary skill in the art will appreciate that the torsional stiffness of the axles 80, 81 and the control arms 20, 30, 40, and 50 may be influenced by a variety of parameters, including material and shape.

In addition to the torsional stiffness of the control arms 20, 30, 40, and 50, vehicle roll may also be affected according to the torsional stiffness of the pivotable joints 13, 14. In the present embodiment, wherein bushings 23, 27, 33, 37, 43, 47, 53, 57 are employed, the torsional stillness of the joint 13, 14 may be affected by the stiffness of the bushings 23, 27, 33, 37, 43, 47, 53, 57.

Figure 10:
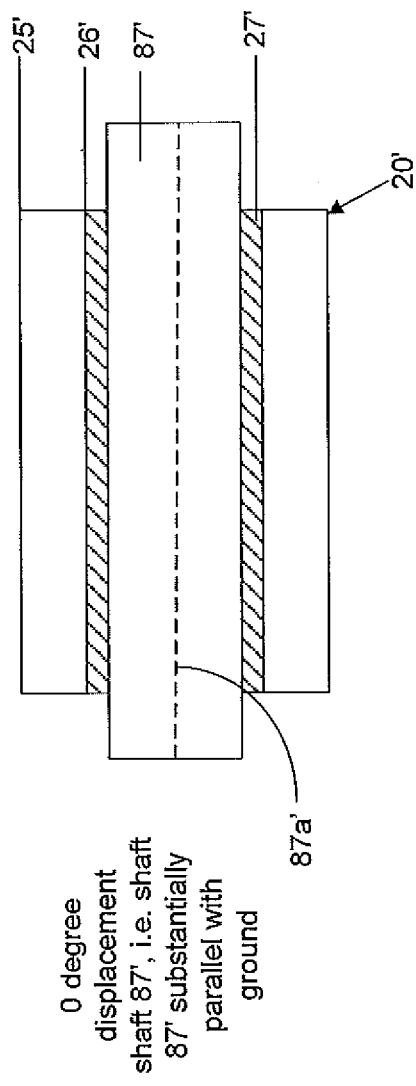
FIG. 10 depicts a relationship between a shaft and a shortened baring surface of a control arm of a four bar link suspension system during a non-roll event.
Figure 11:
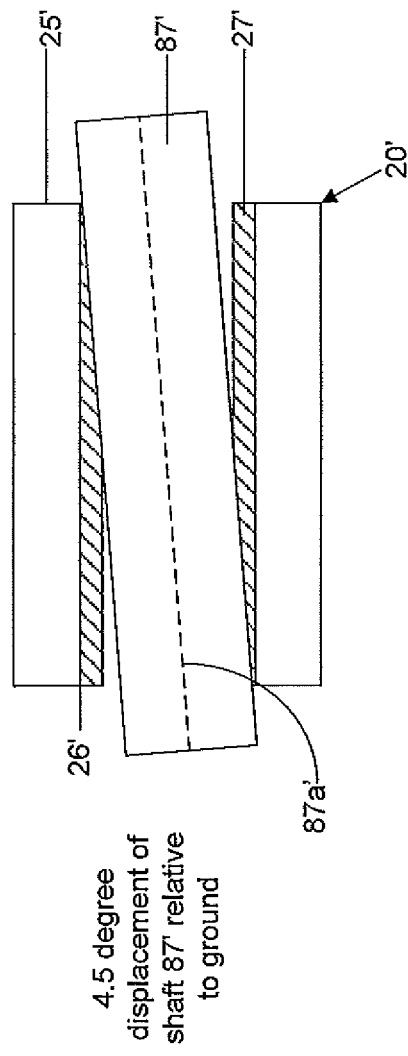
FIG. 11 depicts a relationship between a shaft and a shortened bearing surface of a control arm of a four bar link suspension system during a roll event.

As shown in FIGS. 10-11, in relation to exemplary bushing 27', second portions 25', bearing surfaces 26', and shafts 87', to the extent bushing, compression occurs, an analogous affect of control arm bend and twist occurs, and vehicle roll is promoted, rather than restrained. In particular, in the examples of FIGS. 10-11, the sprung mass would be allowed to roll approximately 4.5° before the bushing 27' fully compressed and the load begun to be transferred to the control arm 20. Assuming a bushing on the first portion of the control arm 20' behaved in a similar manner, the sprung mass would roll approximately 9° before the axles 80, 81 would begin to experience forces tending to induce bend and twist. Accordingly, in the present embodiment, by providing, the bushings 23, 27, 33, 37, 43, 47, 53, 57 with increased stiffness, the axles 80, 81 may begin to bend and twist earlier in the roll event and roll may be restrained earlier in a roll event. Accordingly, while the control arms 20, 30, 40, and 50 may utilize a variety of bushings 23, 27, 33, 37, 43, 47, 53, 57, relatively hard bushings 23, 27, 33, 37, 43, 47, 53, 57 are preferred.

FIG. 13 illustrates the affect use of relatively hard or soft bushings has on vehicle roll in the form of cube plots A, B, C, and D. As shown therein, the cube plots A and C provide the average roll rates achieved according to a number of variables, including the use of relatively soft bushings. For example, and not limitation, in the example modeled, the bushings are provided with a radial rate of 5000 N/mm. Likewise, cube plots B and C provide the average roll rates achieved according to a number of variables, including the use of relatively hard bushings. For example, and not limitation, in the example modeled, the bushings are provided with a radial rate of 50,000 N/mm. As shown, the highest average roll rate, i.e. 26,610 N·m/° is achieved when relatively hard bushings are employed, whereas the lowest average roll rate, i.e. 11,181 N·m/° is achieved when relatively soft bushings are employed.

In addition to bushing stiffness, vehicle roll and the torsional stiffness of the pivotable joints 13, 14 may also be affected by the length of the joints 13, 14. As shown by a comparison of FIGS. 10-12, to the extent bushing compression occurs during a roll event or radial play exists, an increase in the lengths 22L, 26L, 32L, 36L, 42L, 46L, 52L, 56L, of the bearing surfaces 22, 26, 32, 36, 42, 46, 52, 56 of the control arms 20, 30, 40, and 50 reduces the deleterious affect such compression or play has on the roll rate. As shown in FIGS. 11 and 12, the sprung mass 11 would be allowed to roll approximately 4.5 degrees before the bushing 27' is fully compressed and the load fully transferred to die control arm 20'. However, as shown in FIG. 13, by increasing the length of the bearing surface 22, relative to that shown FIG. 12, for a similar roll event, the sprung mass 11 would be allowed to roll only approximately 2.75 degrees before the bushing 27 is fully compressed and the load transferred to the control arm 20. Accordingly, by providing relatively longer lengths 22L, 26L, 32L, 36L, 42L, 46L, 52L, 56L (FIGS. 7A, 7B, 8A, 8B) for the bearing surfaces 22, 26, 32, 36, 42, 46, 52, 56, the amount of vehicle roll may be reduced and the torsional stiffness of the joints 13, 14 may be increased.

FIG. 13 illustrates the affect use of relatively long or short bearing surfaces 22, 26, 32, 36, 42, 46, 52, 56 has on vehicle roll in the form of cube plots A, B, C, and D. As shown therein, the forward most data points in each cube A, B, C, and D show the average roll rate achieved with relatively long bearings surfaces used in connection with the pivotable joints 13. For example, and not limitation, in the example modeled, the bearing surfaces are provided with a length of 150 mm. Likewise, the reward most set of data points in each cube A, B, C, and D show the average roll rate achieved with relatively short bearing surfaces used in connection with the pivotable joints 13. For example, and not limitation, in the example modeled, the bearing surfaces are provided with a length of 70 mm.

Also shown therein, the upper most data points in each cube A, B, C, and D show the average roll rate achieved with relatively long bearings surfaces used in connection with the pivotable joints 14. For example, and not limitation, in the example modeled, the bearing surfaces are provided with a length of 150 mm. Likewise, the lower set of data points in each cube A, B, C, and D show the average roll rate achieved with relatively short bearing surfaces used in connection with the pivotable joints 14. For example, and not limitation, in the example modeled, the bearing surfaces are provided with a length of 70 mm.

As shown, the highest average roll rate, i.e. 26,610 N·m/° in cube B, is achieved when relatively long bearings surfaces 22, 26, 32, 36, 42, 46, 52, 56 are utilized in joints 13, 14, whereas the lowest average roll rate, i.e. 11,181 N·m/° in cube C, is achieved when relatively short bearings surfaces 27, 26, 32, 36, 42, 46, 52, 56 are utilized in joints 13, 14.

Accordingly, unlike previously known arrangements, in the present embodiment, the joints 13, 14 are provided with a torsional stiffness that is selected according to a desired average roll rate for the vehicle. As the torsional stiffness of the joints 13, 14 in the present embodiment, are a function of the stiffness of the bushings 23, 27, 33, 37, 43, 47, 53, 57, by selecting the appropriate stillness, the torsional stiffness of the joints 13, 14 may be tailored to be greater than or substantially equal to the torsional stiffness of the axles 80, 81. Likewise, by selecting the appropriate length for the bearing surfaces, the torsional stiffness of the joints 13, 14 may be tailored to be greater than or substantially equal to the torsional stiffness of the axles 80, 81.

Although discussed in the context of the lower control arms 20, 30, 40, and 50, which longitudinally locate the axles 80, 81, those of ordinary skill in the art will also appreciate that a number of factors influence the ability of the upper control arms 60, 70 to stabilize the lateral location of the axles 80, 81. Such variables include the stiffness of the control arras 60, 70, the orientation of the bushings 67, 68, 77, 78, the span between the bushings 67, 68, 77, 78, the bearing surface 65, 66, 75, 76 lengths, and stiffness of the bushings 67, 68, 77, 78. While the particular arrangements utilized may depend on the type of application and empirical observation, in certain embodiments, it may be desirable to provide the control arms 60, 70 with particular characteristics that enhance lateral stability, including, for example, and not limitation hardened bushings 67, 68, 77, 78 and elongated bearing surfaces 65, 66, 75, 76.

Empirical evidence has also demonstrated that vehicle roll may also be affected by the type of third and sixth control arms 60, 70 utilized. In the presently preferred embodiment, ball joints 62 and 72 are used to connect the control arms 60, 70 to the respective axles 80, 81. In alternative embodiments, other arrangements may be utilized. By way of example, and not limitation, a bushing and bearing surface arrangement may also be employed within the scope of the present invention on the first portions 61, 71 of the control arms 60, 71 for purposes of connecting the control arms 70, 71 to the respective axles 80, 81. For example, a bearing surface 65 and bushing 67 similar to that shown on second portion 63 of third control arm 60 may be employed on the first portion 61. While this alternative arrangement is contemplated within the scope of the present invention, turning now to FIG. 13, and in particular cube B, a comparison of the right side of data points in each cube plot A, B, C, and D, wherein the ball joint arrangement is modeled, relative to the left side of data points, where a hushing arrangement is modeled, demonstrates that a significant increase in roll rate is achieved via the utilization of the ball joint verses a bushing and bearing surface arrangement, i.e. 26,610 N·/° verses 17,112 N·m/°. Accordingly, all other variables being substantially equal in this cube plot B, the inclusion of the ball joints 62, 72 provides a nearly 500 N·m/° increase verses a bushing arrangement.

Advantageously, the average roll rate of 26,610 N·m/° shown in cube plot B in FIG. 13 demonstrates an unexpected synergistic affect achieved by the principals discussed in relation to the preferred embodiment of the present invention. Those of ordinary skill in the art will appreciate that while the presently illustrated principals may be utilized in combination to achieve a preferred level of roll control, in alternative embodiments, a sufficient level of improved roll control may be achieved despite departing from the preferred combination modeled in connection with the data measurement of 26,610 N·m/° in cube plot B. For example, and not limitation, as shown in cube plot A in FIG. 13, a relatively high average roll rate of 18544 N·m/° may be provided despite the use of relatively soft bushings and a bushing arrangement rather than a ball joint arrangement on the third and sixth control arms 60, 70.

Empirical analysis has demonstrated that the roll rate achieved using the principals of the present invention may be elevated to such an extent that insufficient feedback is provided to the driver. Those of ordinary skill in the art will appreciate that while in some applications an extremely high roll rate may be desirable, for example, and not limitation for cement trucks, which are generally not driven at high speeds, in others, however, some roll may be desirable for purposes of driver feedback in terms of whether the vehicle is being driven at a speed that is excessive given road conditions. Even in such situations, however, the principals of the present invention may nonetheless be employed to provide an enhanced level of customized roll control, which has previously not been available on four bar link type suspensions.

Figure 14:
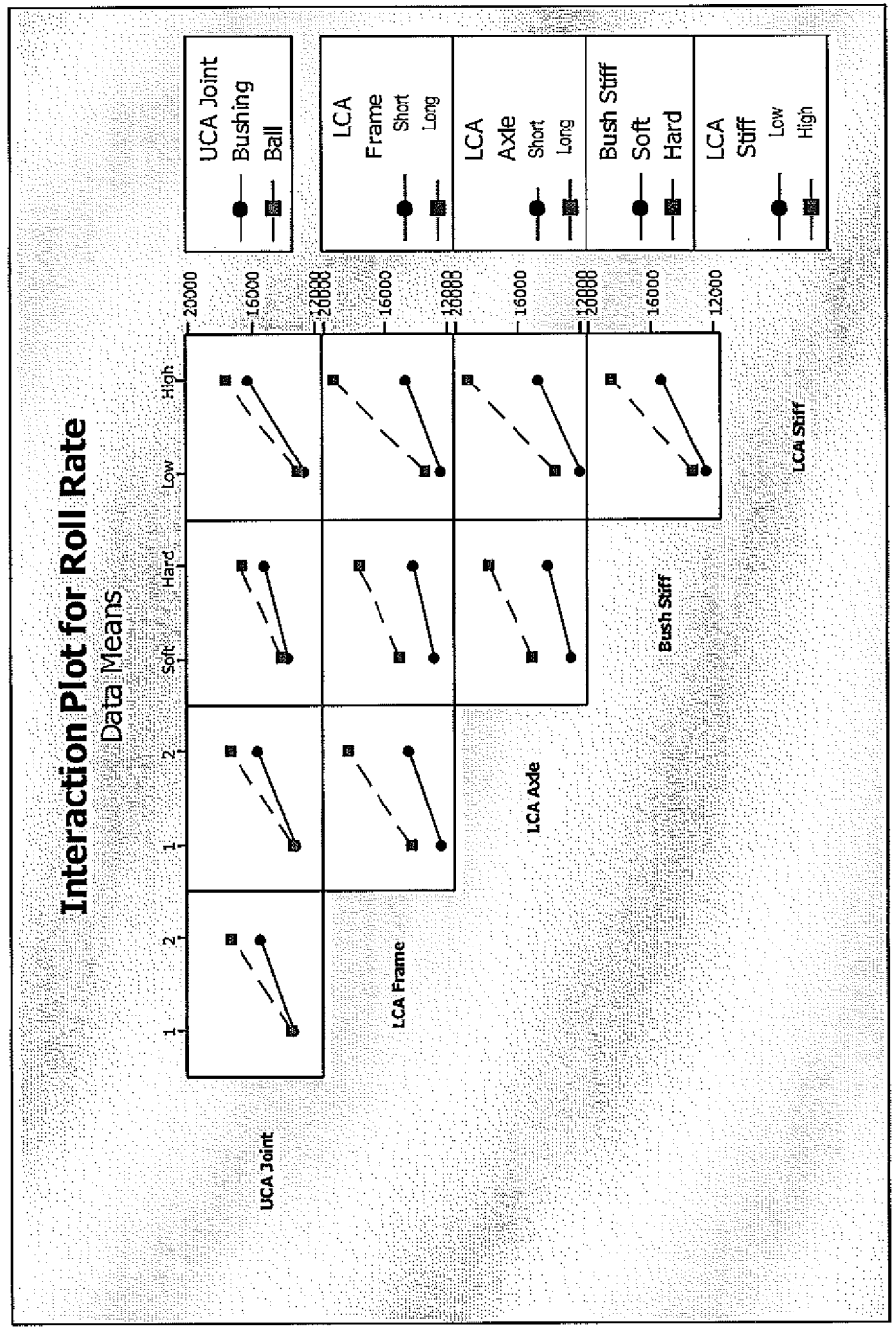
FIG. 14 illustrates a $2^{nd}$ order relationship modeling between the variables modeled in FIG. 13.
Figure 15:
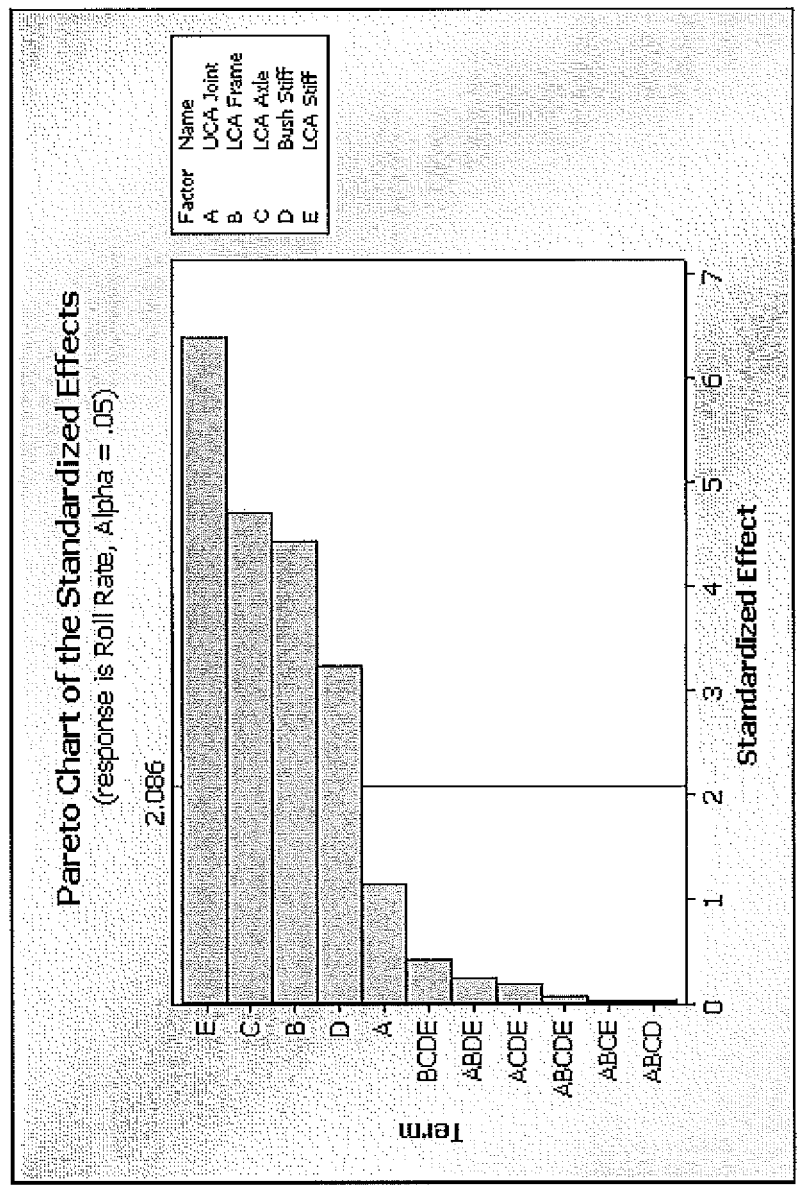
FIG. 15 depicts a Pareto chart illustrating the standardized effects of the variables modeled in FIG. 13.

By way of example, enhanced customized roll control may be provided by the further inclusion or absence of stabilizer bars, by selecting appropriate hearing surface lengths, by selecting the appropriate torsional stiffness of the axles 80, 81, control arms 20, 30, 40, and 50, and joints 13, 14, by selecting the appropriate bushing stiffness, and by selecting an appropriate type of control arm used for lateral stability of the axles 80, 81. The particular combination that provides an optimal level of roll control for my particular situation may be established via modeling or empirical analysis. By way of example, FIG. 14 illustrates a $2^{nd}$ order relationship modeling between the variables modeled in FIG. 13. Furthermore FIG. 15 depicts a Pareto chart illustrating the standardized effects of the variables modeled in FIG. 13, with a standardized effect of substantially equal to or greater than 2,086 indicating features having the most significant effect on roll rate. The particular combination of variables and the selected values for such variables may generate a combination providing a level of roll control, which while less than the highest level that could be achieved in a given situation, may nonetheless be desirable depending on the situation and type of vehicle.

Although the present embodiment, is described in the context of a preferred structure which functions as a four bar link suspension arrangement, those of ordinary skill in the art will appreciate that the principals of the present invention may be employed in other four bar link suspension arrangements. By way of example, and not limitation, the principals may be employed in walking beam arrangements, which also act as a four bar link.

Figure 16:
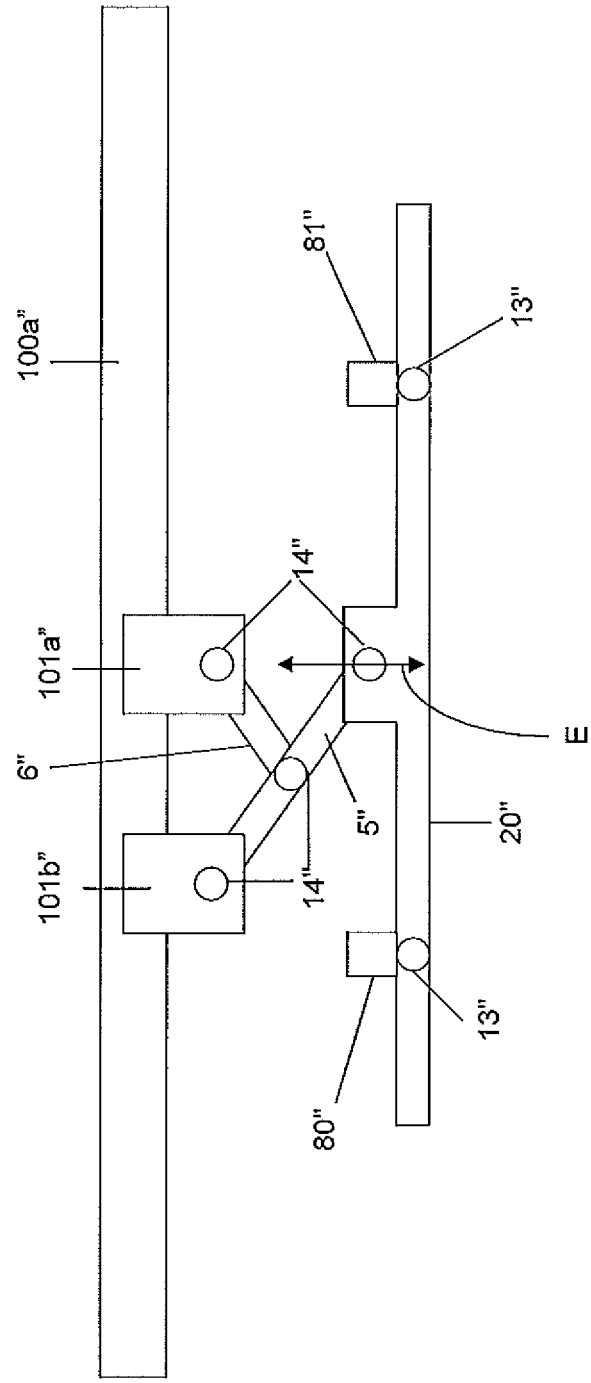
FIG. 16 depicts a schematic view of a suspension system according to an alternative embodiment of the present invention.

Turning now to FIG. 16, a schematic of a floating walking beam arrangement is depicted. As shown therein, a first control arm 20" is pivotably connected to both the axles 80", 81" via pivot joints 13" and to the frame via a plurality of pivot joints 14". Those of ordinary skill in the art will appreciate that the control arm 20' longitudinally locates the first ends of the axles 80, 81 relative to the frame. Those of ordinary skill in the art will also appreciate that control arm 20" may also connect to suspension springs such as springs 111 and dampers 110 in a manner similar to control arms 20 and 40. Those of ordinary skill in the art will appreciate that second control arm (not shown) would be provided on the other side of the vehicle frame (not shown) and that said another control arm (not shown) would longitudinally locates the second ends of the axles 80, 81 relative to the frame in a manner similar to the control arm 20". Furthermore, although not depicted in the present embodiment, those of ordinary skill in the art will appreciate that third and fourth control arms may also be employed for laterally locating the axles 80, 81 with respect to the frame.

In the present embodiment, the, the first control arm 20" is pivotably connected to the frame via a plurality of pivotable joints 14" and connecting control arms 5", 6", which extend from frame hangers 101a, 101b connected to frame member 100a. The arrangement allows the first control arm 20", to move up and down in the direction of arrow E.

As discussed in relation to the embodiment shown in FIGS. 1-6, the control arm 20" may be provided with an increased torsional stiffness and may be configured to induce axial bend and twist in the axles 80", 81" in a manner that is similar to control arms 20 and 50 Since torsional forces would also be applied to connecting control arms 5" and 6" during a roll event and at pivotable joints 13", 14", connecting control arms 5" and 6" and the pivotable joints 13", 14" may also be provided with increased torsional stiffness in a similar manner as joints 13, 14 shown the embodiments of FIGS. 1-6. For example, control arms 20", 5", and 6" may also include elongated bearing surfaces and hardened bushings as well.

The detailed descriptions of the above embodiments are not exhaustive descriptions of all embodiments contemplated by the inventors to be within the scope of the invention. For example, and not limitation, although the suspension system 10 is shown used in conjunction with first and second axles 80, 81, those of ordinary skill in the art will appreciate that the principals of the present invention may be employed in conjunction with a single axle and in conjunction with any type of vehicle used in transport, including vehicles with one or more axles, such as, for example, trailers.

Figure 17:
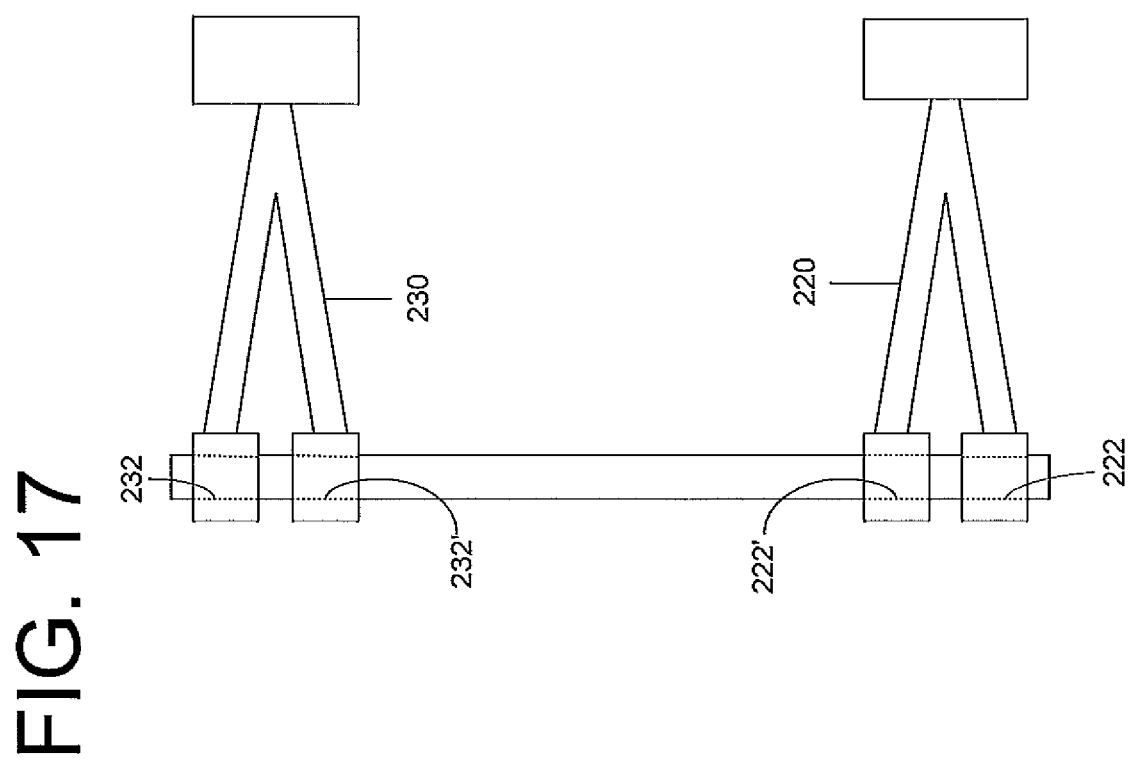
FIG. 17 depicts an alternative embodiment of lower control arms.

Furthermore, although particular examples of one type of control arm 20, 30, 40, and 50 are shown, the present invention contemplates many other arrangements. By way example, those of ordinary skill in art will appreciate that while a single bearing surface, such as bearing surfaces 22, 26, 32, 36, 42, 46, 52, 56 may be employed, that other types control arms, such as A-arms, for example, control arms 220, 230 shown in FIG. 17 may be employed. As shown in FIG. 17, the control arms 220, 230 are provided with spaced bearing surfaces 222, 222' and 232, 232' which couple to the axles 80, 81 in a similar manner as shown in relation to control arms 20, 30, 40, and 50. In such embodiments, the spaced bearing surfaces 222, 222' and 232, 232' in effect act as one elongated bearing surface. By way of another example, although the depicted control arms 20, 30, 40, 50 are shown provided with bearing surfaces that define bores that receive bushings and are pivotably mounted to shafts, those of ordinary skill in the art will appreciate that the bearing surfaces could be provided as shafts that are pivotably mounted to bored surfaces.

Accordingly, those of ordinary skill in the art will appreciate that it is within the scope of the present invention to provide control arms that are provided with a variety of geometries and that the invention may employ any type of control arm which forms a component of a four bar linkage that controls the longitudinal location during driving events, including but not limited to single purpose or dual purpose suspension members, such as, for example, and not limitation, leaf springs or stabilizer bars that double as control arms.

By way of yet another example, although the illustrated embodiments may employ v-shaped control arms 60 and 70 for purposes of lateral location, those of ordinary skill in the art will appreciate that other control arm arrangements may be employed to locate the axles 80, 81 laterally. By way of example, and not limitation, a Panhard rod or Watts linkage type control arm may be employed.

Furthermore, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims.

We claim:

1. A vehicle, comprising:
   an axle provided with a torsional stiffness and a first end and a second end;
   a sprung mass, including a frame, mounted to the axle whereby the sprung mass may roll relative to the axle;
   a first control arm that longitudinally locates the first end of the axle relative to the frame and includes a torsional stiffness;
   a second control arm that longitudinally locates the second end of the axle relative to the frame and includes a torsional stiffness;
   a third control arm that laterally locates the axle relative to the frame;
   a first pivotable joint that pivotably connects the first control arm to the first end of the axle, the first pivotable joint provided with a torsional stiffness;
   a second pivotable joint that pivotably connects the first control arm to the frame, the second pivotable joint provided with a torsional stiffness;
   a third pivotable joint that pivotably connects the second control arm to the second end of the axle, the third pivotable joint provided with a torsional stiffness;
   a fourth pivotable joint that pivotably connects the second control arm to the frame, the fourth pivotable joint provided with a torsional stiffness; and
   the torsional stiffness of the first control arm, the second control aim, the first pivotable joint, the second pivotable joint, the third pivotable joint, and the fourth pivotable joint are substantially equal to or greater than the torsional stiffness of the axle, whereby the axle bends and twists during a sprung mass roll event in order to limit an amount of roll.

2. The vehicle according to claim 1, wherein the torsional stiffness of the first control arm and the second control arm are substantially equal to the torsional stiffness of the axle, whereby the axle and the first and second control arms bend and twist during a sprung mass roll event in order to limit the amount of roll.

3. The vehicle according to claim 1, wherein the torsional stiffness of the first control arm, the second control arm, the first pivotable joint, the second pivotable joint, the third pivotable joint, and the fourth pivotable joint are substantially equal to the torsional stiffness of the axle, whereby the axle, the first and second control arms, and the joints bend and twist during a sprung mass roll event in order to limit the amount of roll.

4. The vehicle according to claim 1, wherein the first joint includes a first portion on the first control arm, the second joint includes a second portion on the first control arm, the third joint includes a first portion on the second control arm, and the fourth joint includes a second portion on the second control arm, wherein:
the first portion of the first control arm is provided with a bearing surface that pivotably connects the first control arm to the first end of the axle, wherein the bearing surface is provided with a length that is selected so that the first joint is provided with the torsional stiffness substantially equal to or greater than the torsional stiffness of the axle;
the second portion of the first control arm is provided with a bearing surface that pivotably connects the first control arm to the frame, wherein the bearing surface is provided with a length that is selected so that the second joint is provided with the torsional stiffness substantially equal to or greater than the torsional stiffness of the axle;
the first portion of the second control arm is provided with a bearing surface that pivotably connects the second control arm to the second end of the axle, wherein the bearing surface is provided with a length that is selected so that the third joint is provided with the torsional stiffness substantially equal to or greater than the torsional stiffness of the axle; and
the second portion of the second control arm is provided with a bearing surface that pivotably connects the second control arm to the frame, wherein the bearing surface is provided with a length that is selected so that the fourth joint is provided with the torsional stiffness substantially equal to or greater than the torsional stiffness of the axle.

5. The vehicle according to claim 1, wherein the first joint includes a first portion on the first control arm, the second joint includes a second portion on the first control arm, the third joint includes a first portion on the second control arm, and the fourth joint includes a second portion on the second control arm, wherein:
the first portion of the first control arm is provided with a bearing surface and a bushing that pivotably connect the first control arm to the first end of the axle, wherein the bushing is provided with a radial rate selected so that the first joint is provided with the torsional stiffness substantially equal to or greater than the torsional stiffness of the axle;
the second portion of the first control arm is provided with a bearing surface and a bushing that pivotably connect the first control arm to the frame, wherein the bushing is provided with a radial rate selected so that the second joint is provided with the torsional stiffness substantially equal to or greater than the torsional stiffness of the axle;
the first portion of the second control arm is provided with a bearing surface and a bushing that pivotably connect the first control arm to the first end of the axle, wherein the bushing is provided with a radial rate selected so that the third joint is provided with the torsional stiffness substantially equal to or greater than the torsional stiffness of the axle; and
the second portion of the second control arm is provided with a bearing surface and a bushing that pivotably connect the first control arm to the frame, wherein the bushing is provided with a radial rate selected so that the fourth joint is provided with the torsional stiffness substantially equal to or greater than the torsional stiffness of the axle.

6. The vehicle according to claim 1, wherein the first joint includes a first portion on the first control arm, the second joint includes a second portion on the first control arm, the third joint includes a first portion on the second control arm, and the fourth joint includes a second portion on the second control arm, wherein:
the first portion of the first control arm is provided with a bearing surface and a bushing that pivotably connect the first control arm to the first end of the axle, wherein the bearing surface is provided with a length and the bushing is provided with a radial rate, wherein the length and the radial rate are selected so that the first joint is provided with the torsional stiffness substantially equal to or greater than the torsional stiffness of the axle;
the second portion of the first control arm is provided with a bearing surface and a bushing that pivotably connect the first control arm to the frame, wherein the bearing surface is provided with a length and the bushing is provided with a radial rate, wherein the length and the radial rate are selected so that the second joint is provided with the torsional stiffness substantially equal to or greater than the torsional stiffness of the axle;
the first portion of the second control arm is provided with a bearing surface and a bushing that pivotably connect the first control arm to the first end of the axle, wherein the bearing surface is provided with a length and the bushing is provided with a radial rate, wherein the length and the radial rate are selected so that the first joint is provided with the torsional stiffness substantially equal to or greater than the torsional stiffness of the axle; and
the second portion of the second control arm is provided with a bearing surface and a bushing that pivotably connect the first control arm to the frame, wherein the bearing surface is provided with a length and the bushing is provided with a radial rate, wherein the length and the radial rate are selected so that the second joint is provided with the torsional stiffness substantially equal to or greater than the torsional stiffness of the axle.

7. The vehicle according to claim 6, wherein the third control arm is provided with a ball joint that pivotably connects the third control arm to the axle, whereby the third control arm is moveable up and down with the axle.

8. The vehicle according to claim 6, wherein the third control arm is provided with:
a first portion that includes a ball joint that pivotably connects the third control arm to the axle, whereby the third control arm is moveable up and down to the axle; and
second and third portions that extend from the first portion to provide a generally V-shaped third control arm, wherein the second and third portions pivotably connect the third control arm to the frame.

9. The vehicle according to claim 1, wherein the third control arm is provided with a ball joint that pivotably connects the third control arm to the axle, whereby the third control arm is moveable up and down with the axle.

10. The vehicle according to claim 1, further comprising a plurality of second and fourth pivotable joints and connecting control arms that pivotably connect the first and second control arms to the frame, wherein the second pivotable joint is one of the plurality of second pivotable joints and the fourth pivotable joint is one of the plurality of fourth pivotable joints.

11. A method for improving the roll characteristics of a vehicle, comprising the steps of:
providing an axle including a first end, a second end and a torsional stiffness;
providing a sprung mass, including a frame, mounted to the axle whereby the sprung mass may roll relative to the axle;
providing a first control arm that longitudinally locates the first end of the axle relative to the frame and includes a torsional stiffness;
providing a second control arm that longitudinally locates the second end of the axle relative to the frame and includes a torsional stiffness;
providing a third control arm that laterally locates the axle relative to the frame;
providing a first pivotable joint that pivotably connects the first control arm to the first end of the axle and includes a torsional stiffness;
providing a second pivotable joint that pivotably connects the first control arm to the frame and includes a torsional stiffness;
providing a third pivotable joint that pivotably connects the second control arm to the second end of the axle and includes a torsional stiffness;
providing a fourth pivotable joint that pivotably connects the second control arm to the frame and includes a torsional stiffness; and
selecting the torsional stiffness of the first control arm, the second control arm, the first pivotable joint, the second pivotable joint, the third pivotable joint, and the fourth pivotable joint to be substantially equal to or greater than the torsional stiffness of the axle, whereby the axle bends and twists during a sprung mass roll event in order to limit an amount of roll.

12. The method for improving the roll characteristics of a vehicle according to claim 11, wherein the torsional stiffness of the first control arm and the second control arm are selected to be substantially equal to the torsional stiffness of the axle, whereby the axle and the first and second control arms bend and twist during a sprung mass roll event in order to limit the amount of roll.

13. The method for improving the roll characteristics of a vehicle according to claim 11, wherein the torsional stiffness of the first control arm, the second control arm, the first pivotable joint, the second pivotable joint, the third pivotable joint, and the fourth pivotable joint are selected to be substantially equal to the torsional stiffness of the axle, whereby the axle, the first and second control arms, and the joints bend and twist during a sprung mass roll event in order to limit the amount of roll.

14. The method for improving the roll characteristics of a vehicle according to claim 11, wherein the first joint includes a first portion on the first control arm, the second joint includes a second portion on the first control arm, the third joint includes a first portion on the second control arm, and the fourth joint includes a second portion on the second control arm, wherein:
the first portion of the first control arm is provided with a bearing surface that pivotably connects the first control arm to the first end of the axle, wherein the bearing surface is provided with a length that is selected so that the first joint is provided with the torsional stiffness substantially equal to or greater than the torsional stiffness of the axle;
the second portion of the first control arm is provided with a bearing surface that pivotably connects the first control arm to the frame, wherein the bearing surface is provided with a length that is selected so that the second joint is provided with the torsional stiffness substantially equal to or greater than the torsional stiffness of the axle;
the first portion of the second control arm is provided with a bearing surface that pivotably connects the second control arm to the second end of the axle, wherein the bearing surface is provided with a length that is selected so that the third joint is provided with the torsional stiffness substantially equal to or greater than the torsional stiffness of the axle; and
the second portion of the second control arm is provided with a bearing surface that pivotably connects the second control arm to the frame, wherein the bearing surface is provided with a length that is selected so that the fourth joint is provided with the torsional stiffness substantially equal to or greater than the torsional stiffness of the axle.

15. The method for improving the roll characteristics of a vehicle according to claim 11, wherein the first joint includes a first portion on the first control arm, the second joint includes a second portion on the first control arm, the third joint includes a first portion on the second control arm, and the fourth joint includes a second portion on the second control arm, wherein:
the first portion of the first control arm is provided with a bearing surface and a bushing that pivotably connect the first control arm to the first end of the axle, wherein the bushing is provided with a radial rate selected so that the first joint is provided with the torsional stiffness substantially equal to or greater than the torsional stiffness of the axle;
the second portion of the first control arm is provided with a bearing surface and a bushing that pivotably connect the first control arm to frame, wherein the bushing is provided with a radial rate selected so that the second joint is provided with the torsional stiffness substantially equal to or greater than the torsional stiffness of the axle;
the first portion of the second control arm is provided with a bearing surface and a bushing that pivotably connect the first control arm to the first end of the axle, wherein the bushing is provided with a radial rate selected so that the third joint is provided with the torsional stiffness substantially equal to or greater than the torsional stiffness of the axle; and
the second portion of the second control arm is provided with a bearing surface and a bushing that pivotably connect the first control arm to the frame, wherein the bushing is provided with a radial rate selected so that the fourth joint is provided with the torsional stiffness substantially equal to or greater than the torsional stiffness of the axle.

16. The method for improving the roll characteristics of a vehicle according to claim 11, wherein the first joint includes a first portion on the first control arm, the second joint includes a second portion on the first control arm, the third joint includes a first portion on the second control arm, and the fourth joint includes a second portion on the second control arm, wherein:

the first portion of the first control arm is provided with a bearing surface and a bushing that pivotably connect the first control arm to the first end of the axle, wherein the bearing surface is provided with a length and the bushing is provided with a radial rate, wherein the length and the radial rate are selected so that the first joint is provided with the torsional stiffness substantially equal to or greater than the torsional stiffness of the axle;

the second portion of the first control arm is provided with a bearing surface and a bushing that pivotably connect the first control arm to the frame, wherein the bearing surface is provided with a length and the bushing is provided with a radial rate, wherein the length and the radial rate are selected so that the second joint is provided with the torsional stiffness substantially equal to or greater than the torsional stiffness of the axle;

the first portion of the second control arm is provided with a bearing surface and a bushing that pivotably connect the first control arm to the first end of the axle, wherein the bearing surface is provided with a length and the bushing is provided with a radial rate, wherein the length and the radial rate are selected so that the first joint is provided with the torsional stiffness substantially equal to or greater than the torsional stiffness of the axle; and the second portion of the second control arm is provided with a bearing surface and a bushing that pivotably connect the first control arm to the frame, wherein the bearing surface is provided with a length and the bushing is provided with a radial rate, wherein the length and the radial rate are selected so that the second joint is provided with the torsional stiffness substantially equal to or greater than the torsional stiffness of the axle.

17. The method for improving the roll characteristics of a vehicle according to claim 16, wherein the third control arm is provided with a ball joint that pivotably connects the third control arm to the axle, whereby the third control arm is moveable up and down with the axle.

18. The method for improving the roll characteristics of a vehicle according to claim 16, wherein the third control arm is provided with:
   a first portion that includes a ball joint that pivotably connects the third control arm to the axle, whereby the third control arm is moveable up and down to the axle; and
   second and third portions that extend from the first portion to provide a generally V-shaped third control arm, wherein the second and third portions pivotably connect the third control arm to the frame.

19. The method for improving the roll characteristics of a vehicle according to claim 11, wherein the third control arm is provided with a ball joint that pivotably connects the third control arm to the axle, whereby the third control arm is moveable up and down with the axle.

20. The method for improving the roll characteristics of a vehicle according to claim 11, further comprising the step of providing a plurality of second and fourth joints and connecting control arms that pivotably connect the first and second control arms to the frame, wherein the second pivotable joint is one of the plurality of second pivotable joints and the fourth pivotable joint is one of the plurality of fourth pivotable joints.

* * * * *